(12) United States Patent
Osawa et al.

(10) Patent No.: US 6,538,852 B1
(45) Date of Patent: Mar. 25, 2003

(54) BEARING DEVICE WITH DAMPING MECHANISM

(75) Inventors: Harushige Osawa, Shiga (JP); Hongbing Du, Shiga (JP)

(73) Assignee: Nidec Corporation, Kyoto (JP)

(*) Notice: Subject to any disclaimer, the term of this patent is extended or adjusted under 35 U.S.C. 154(b) by 0 days.

(21) Appl. No.: 09/472,435

(22) Filed: Dec. 27, 1999

(30) Foreign Application Priority Data

Dec. 25, 1998 (JP) .......................................... 10-371237
Mar. 30, 1999 (JP) .......................................... 11-088404
Mar. 30, 1999 (JP) .......................................... 11-088405

(51) Int. Cl.[7] .......................... G11B 21/08; G11B 5/55
(52) U.S. Cl. ................................................. 360/265.2
(58) Field of Search .......................... 360/265.2, 265.6, 360/265.4, 264.1, 264, 260, 240, 265.7; 310/51, 90; 464/180, 179

(56) References Cited

U.S. PATENT DOCUMENTS

| 4,933,792 A | * | 6/1990 | Sleger et al. ............ 360/264.7 |
| 5,365,842 A | * | 11/1994 | Panossian .................... 101/216 |
| 5,491,598 A | | 2/1996 | Stricklin et al. ......... 360/265.6 |
| 5,666,862 A | * | 9/1997 | Eckel et al. .................... 74/574 |
| 6,125,977 A | * | 10/2000 | Nekomoto et al. ......... 188/378 |
| 6,220,970 B1 | * | 4/2001 | Berger et al. ............... 464/180 |

FOREIGN PATENT DOCUMENTS

| JP | 62-054878 | | 3/1987 |
| JP | 64-048277 | | 2/1989 |
| JP | 3-181638 | * | 8/1991 |
| JP | 04-064979 | | 2/1992 |

* cited by examiner

Primary Examiner—Hoa T. Nguyen
Assistant Examiner—Julie Anne Watko
(74) Attorney, Agent, or Firm—Burns, Doane, Swecker & Mathis, LLP

(57) ABSTRACT

A head assembly supports an arm for angular displacement about an axis in a disk drive. The bearing assembly includes a fixed shaft 3, a plurality of bearings 6 and 7, a sleeve 4 and dampers 8. The bearings 6 and 7 are disposed about the shaft 3. The sleeve is coupled to the bearings 6 and 7 for angular displacement about the shaft 3, and one or more darpers 8 are coupled to the sleeve. Each damper includes a plurality of holding portions and one or more damping masses the holding portions are arranged circumferentially about the axis of the shaft as an axis of rotation of the arm, and distance between each adjacent two damping portions is approximately equal to each other, each holding portion has an inner space. The damping masses are movably accommodated in the inner space of the respective holding portions. The energy of the vibration of the head and the arm is absorbed in a short time by movements of the damping masses and by friction between the damping masses and inner surface of the holding portion, and/or by collisions of the damping masses.

15 Claims, 30 Drawing Sheets

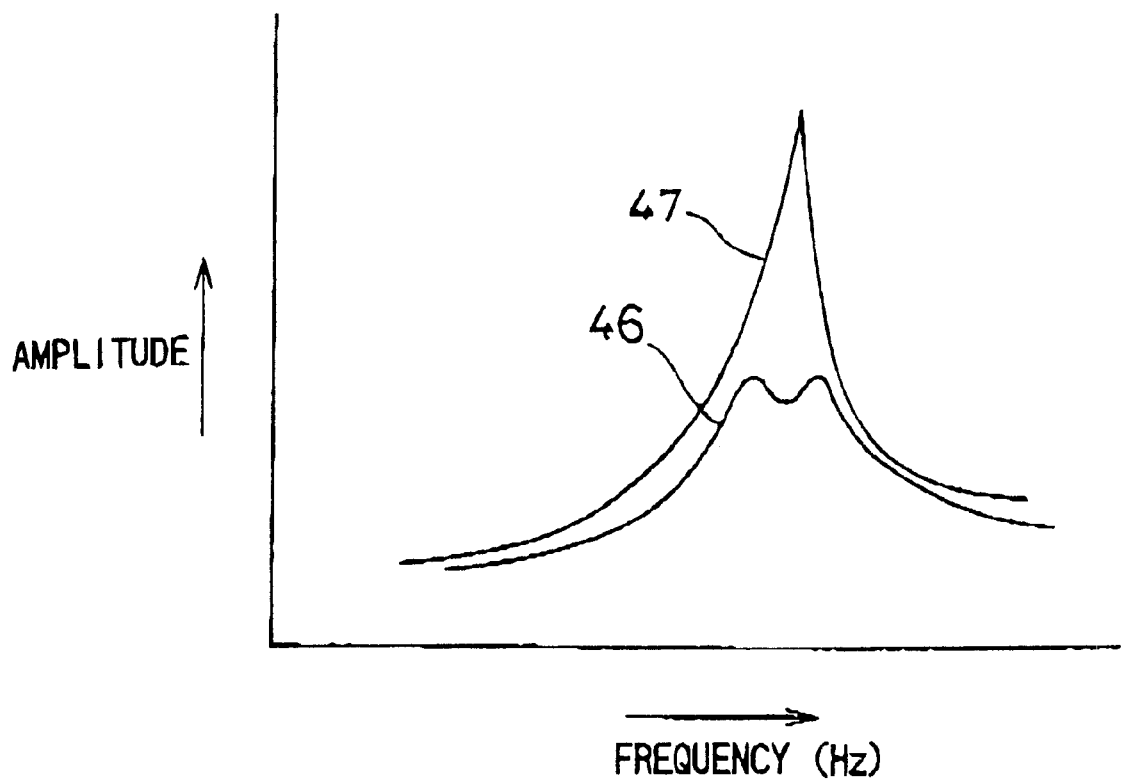

BEARING DEVICE WITH DAMPING MECHANISM

BACKGROUND OF THE INVENTION

1. Field of the Invention

The present invention relates to a bearing device for relative rotation or angular movement of a shaft and sleeve, and more particularly the invention pertains to such a bearing device for supporting a shaft and a sleeve such that the shaft and sleeve is stopped at a required relative position in a short time after being rotated or angularly displaced relatively at a substantial speed. Although not limited thereto, the bearing device of the present invention is effectively used for a pivot assembly which rotatably support an arm carrying a head for reading and/or writing data on a storage media, such as a hard disk. The present invention also relates to a storage media driving device provided with such bearing device.

2. Description of the Prior Arts

A hard disk drive generally includes a magnetic head for reading and writing data on a magnetic layer of a hard disk. The head is carried on a tip of an arm which is pivotably supported by a bearing device, conventionally referred to as pivot assembly. The bearing device is essentially composed of a stationary shaft fixed on a base or housing of the disk drive, and a sleeve coupled with the arm and supported on the shaft through a bearing such that the arm and sleeve integrally pivot on the shaft about an axis of rotation extending longitudinally through the center of the shaft, The arm is associated with a voice coil motor to be driven thereby from a rest position to a required angular position where the head opposes a required track of the disk to access and read or write data.

In recent years, the density of data to be recorded on a hard disk in a disk drive apparatuses have been increased remarkably and the processing speeds of computer have been increased. To achieve those improvements, access time of disk drive apparatuses is now required to be extremely short. To this end, it is necessary to drive, at high speed, the head to a desired position above the disk. That is, it is necessary to angularly displace the head by a required angle instantaneously. Because of the recent increase in the recorded data density on disks, width of the recording track has been made very small. Therefore, in data access operation, high preciseness is required for the positioning of the head at its read/write position. Accordingly the arm must pivot at high speed and stopped exactly at a prescribed angular position. However, as the arm is driven at higher speed, vibrations of the arm occurring after the stoppage of the arm are likely to increase infamplitude and attenuation period. To enable high-speed access in the disk drive apparatus, it is necessary to effectively attenuate the vibrations of the head assembly including the head and the arm, since data writing or reading cannot be started until the vibration disappears and the vibration attenuation time is directly added to the access time.

Conventionally, there are proposed several techniques for attenuating the vibration of the head assembly caused by stoppage of its pivotal or angular movement during the access to a desired track on the disk. For example, Japanese Unhexamined Patent Publication JP-A 62-54878 discloses a head actuator device in which a bobbin of a voice coil is provided with a damper which in turn, comprises viscous grease and a number of small-diameter damping mass bodies such as small metal balls sealed in a hermetically sealed box. Vibration is attenuated by the movement of the damping mass bodies which are enclosed by the viscous grease. Japanese Unexamined Patent Publication JP-A 64-48277 discloses another type of a damping mechanism in which a damper, comprises a weight attached to the tip of the arm via the vibration isolating rubber member. Vibration is attenuated in such a manner that the vibration isolating rubber member is deformed as the weight moves. Further, Japanese Unexamined Patent Publication JP-A 4-64979 discloses a damping device in which a hole is formed on the arm at its longitudinally middle portion and granular materials or liquid or a combination of those is sealed in the hole. Vibration is attenuated by movement of the granular materials and/or the liquid.

As described above, vibration of the head assembly is caused when its angular movement is stopped at the time of data access. To shorten the access time, it is necessary to effectively attenuate vibration of the entire head assembly. To this end, it is necessary that the damping effect is uniform around the axis of rotation of the arm, i.e. in all directions from the axis.

In the apparatus of JP-A 62-54878, JP-A 64-48277 and JP-A 4-64979, the damper is provided at the tip portion or the middle portion of the arm or on the bobbin of the voice coil. Consequently, with the conventional damping structures, damping is effected in a particular direction at a distance from the axis of rotation. Thus, the damping effect is different with the directions from the axis and is not effective and sufficient. Further, the structure in which the damper is provided at the tip portion or the middle portion of the arm or in the voice coil has a problem that vibration of the head may be amplified depending on the natural frequency of the combination of the damper and the arm (since the arm has elasticity and the combination of the damper and the arm has a natural frequency). Many hard disk drive has a plurality of heads and arms for reading and writing data on a plurality of hard disks mounted on a spindle motor. In such a case, the above mentioned conventional damping device must be provided for each of the arm, resulting increase of manufacturing process and costs.

U.S. Pat. No. 5,491,598 discloses another actuator system having a structure for attenuating vibration of the head assembly. This actuator system includes a bearing assembly for supporting an actuator arm for rotation about an axis in a disk drive. The bearing assembly includes a shaft generally defining the axis. A plurality of bearings are disposed about the shaft, and a sleeve is coupled to the bearings for rotation about the shaft. A damper is coupled to the sleeve to damp vibration of the rotary actuator in one preferred embodiment of the U.S. Pat. No. 5,491,598, the shaft has an external surface and the sleeve has an inner surface generally facing the external surface of the shaft. The damper includes a damping material coupled to the inner surface of the sleeve. The damper also includes a damping member coupled to the damping material within the sleeve.

In the damper structure disclosed by the above USP, one cylindrical damping member (i.e. a damping mass) is disposed movably around the shaft and is held by two damping materials (presumably made of viscoelastic material) in order to attach the damping member to the inner surface of the sleeve. And these two damping materials are symmetrically arranged with respect to the axis of the shaft. Such a damping structure cannot sufficiently attenuate angular vibration.

SUMMARY OF THE INVENTION

It is accordingly an object off the present invention to provide a damping device for pivoting assembly that effectively attenuate vibration of a pivoting member when it is stopped.

It is another object of the present invention to provide a well balanced damping device for effectively damping vibration of an actuator arm for a storage disk drive device.

It is yet another object of the present invention to provide a highly responsive data read/write device for a computer.

It is further object of the present invention to provide a data access mechanism in which an arm carrying data read/write head is stopped with a short vibration attenuating time even if the arm is driven at high speed.

It is still further object of the present invention to provide a data storage device in which data access time is short.

To attain the above mentioned objects, a damping mechanism according to one aspect of the present invention, comprises a plurality of, preferably more than two, damping portions circumferentially arranged around an axis of rotation of an arm which carries a head for read or write data on a disk shaped data storage media The damping portions are disposed or located at regular intervals or extensions. Each damping portion includes a holding section that movably holds or supports one or more damping mass which in turn collides or abuts against a portion of the holding section. Such collision as well as movement of the damping mass effectively attenuate the vibration caused when the arm is stopped.

The damping mechanism is coupled with a sleeve which, in turn, is supported on a shaft through a bearing mechanism and is connected with the arm to move or pivot integrally therewith in angular direction. As an alternation the damping mechanism may be coupled with other portion of the hear carrying arm driving mechanism so far as the damper is coupled with or associated with a part movable with the arm and the damping sections or elements are arranged to circularly at regular, intervals or extensions. As to the regularity of the arrangement, the damping sections or elements may preferably arranged at the same or equal intervals or extension.

According to an aspect of the present invention, one or more spherical or ball-shape damping mass or masses is accommodated in each of circularly arranged sector-shape compartments or cylindrical recesses such that the damping mass rolls in and collides against the wall of the compartment or recess to absorb the vibration energy. The spherical or ball shape of the damping mass makes the latter unstable in the compartment or recess so that the damping mechanism is responsive to even small amplitude vibration and attenuate the vibration effectively in a short time. The recess may be formed with a projection on its bottom to enhance unstableness of sustaining the damping mass, thereby making the damping mechanism more sensitive and responsive to the vibration.

In some preferred embodiments, the sector shaped compartments have the same circular extension with each other and arranged side-by-side to make a circle that is concentric with the axis of rotation of the arm. With this structure, damping is effectuated evenly around the axis of rotation. The compartments may be integrally coupled with a sleeve which is supported by a stationary shaft through a pair of ball bearings. The circle of the compartments may be disposed between the ball bearings. In an embodiment of the present invention, the circle of compartments is two in number and two circles of compartments are aligned in axial direction. Another circle of compartment may be coupled with the sleeve. A partition between each adjacent compartments may be flexible or resilient to absorb vibration energy effectively when the damping mass or masses collides against the partition. Fluid material such as liquid or granules may be in each compartment with or without the damping mass member to effectuate damping.

According to another embodiments, the damping masses may be supported, sustained or suspended by a spring or resilient rod on a holding member which may be flat plate or in a recess. In a simplified form of an embodiment of the invention, resilient or elastic rods, as collision members, are respectively associated with springs and provided on a holding plate such that they swing on the plate and the rod and spring collide each other.

BRIEF DESCRIPTION OF THE DRAWINGS

Other and further objects, features, and advantages of the invention will be more explicit from the following detailed description taken with reference to the drawings wherein:

FIG. 16 is a comparative graph showing an amplitudes characteristic of the embodiment relating to FIGS. 15A and 15B;

in FIG. 27;

DETAILED DESCRIPTION OF THE PREFERRED EMBODIMENTS

Figure 1:
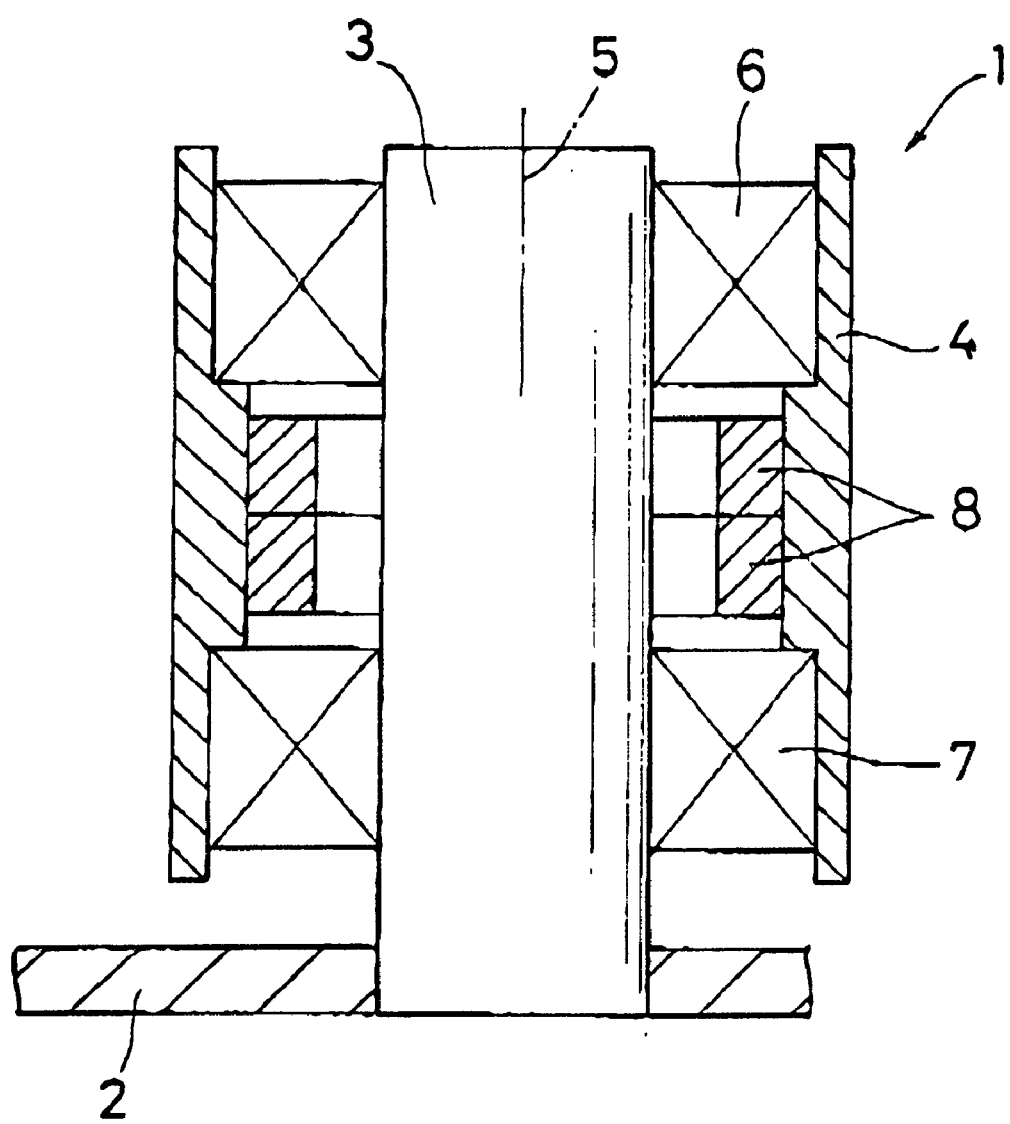
FIG. 1 is a schematic vertical sectional view of a bearing device for a disk drive according to an embodiment of the present invention.

Now referring to the drawings, preferred embodiments of the invention are described below.

First, a first group of the embodiments of the invention will be described with reference to FIGS. 1 through 16.

FIG. 1 is a simplified vertical sectional view of a bearing device 1 for a disk drive according to an embodiment of the present invention. This bearing device 1 for a disk drive, which can also be referred to as a pivot bearing cartridge, includes a fixed shaft 3 fixed to a chassis 2 of a disk drive apparatus and a sleeve 4 rotatably supported by the shaft 30 through a pair of bearings 6 and 7. The shaft 5 extends vertically from the chassis 2. The sleeve 4 is coaxial with the shaft 3 with respect to the axis 5 of rotation. The sleeve 14 turns around the shaft 3. A pair of dampers 8 are arranged between the bearings 6 and 7 to absorb circumferential vibrations energy of the sleeve 4.

Figure 2:
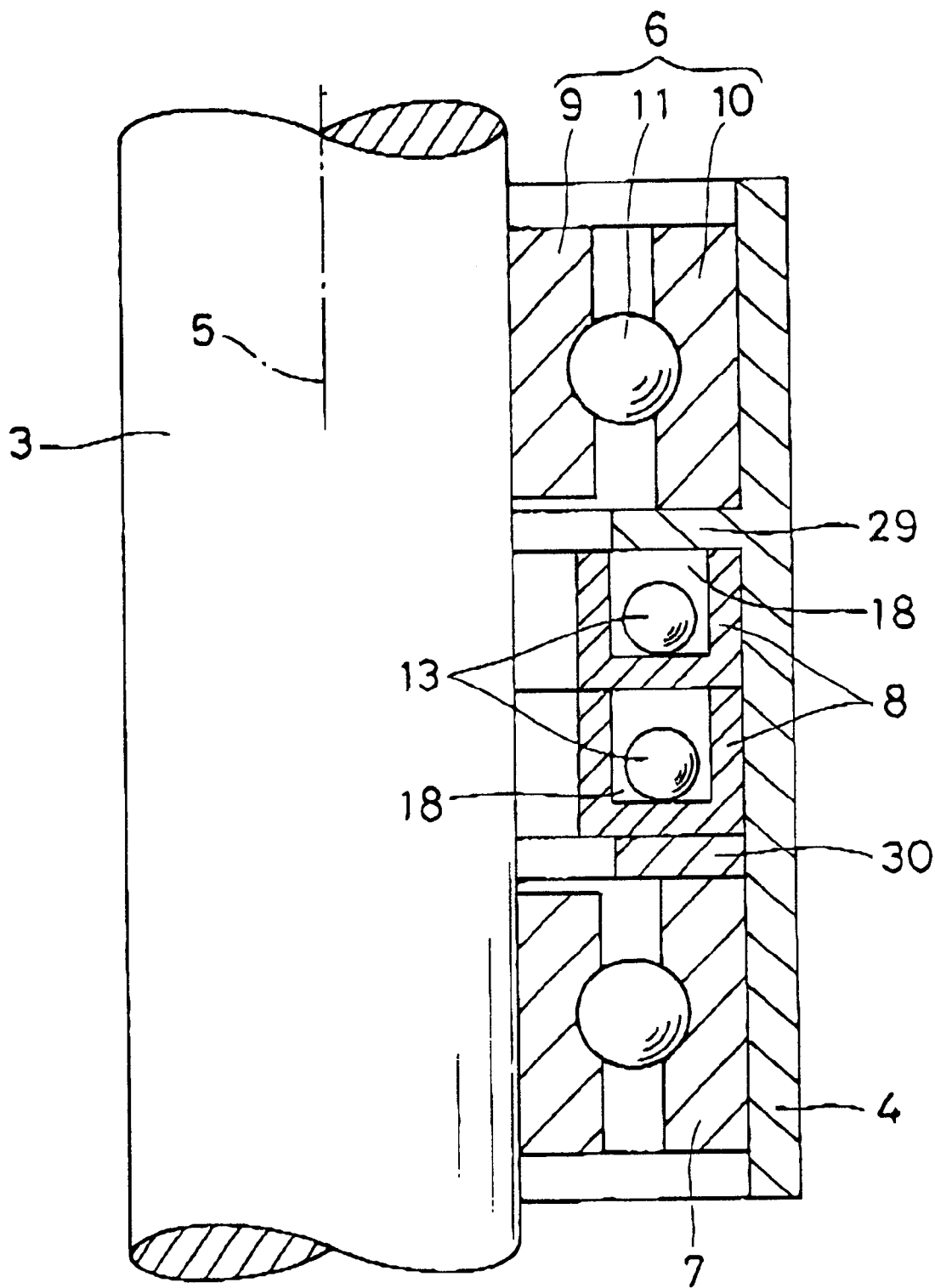
FIG. 2 is a partial enlarged vertical sectional view of the bearing device for a disk drive shown in FIG. 1.

FIG. 2 is an enlarged sectional view of part of the bearing device 1 for a disk drive shown in FIG. 1. The bearing 6 is a ball bearing which has an inner race 9 fixed to the outside circumferential surface of the shaft 3, an outer race fixed to the inside circumferential surface of the sleeve 4, and a plurality of balls 11 interposed between the inner ring 9 and the outer ring 10. The bearing 6 can bear radial force and thrust force. The other bearing 7 has the same structure as the bearing 6.

The dampers 8 are adjoined in the axial direction (i.e., the top to bottom direction in FIGS. 1 and 2). As shown in FIG. 2, the dampers 8 are sandwiched between an annular projection 29 and an annular support ring 30. The annular projection 29 projects radially inward from the inside circumferential surface of the sleeve 4. The annular support ring 30 is fitted to the sleeve 4.

Figure 3:
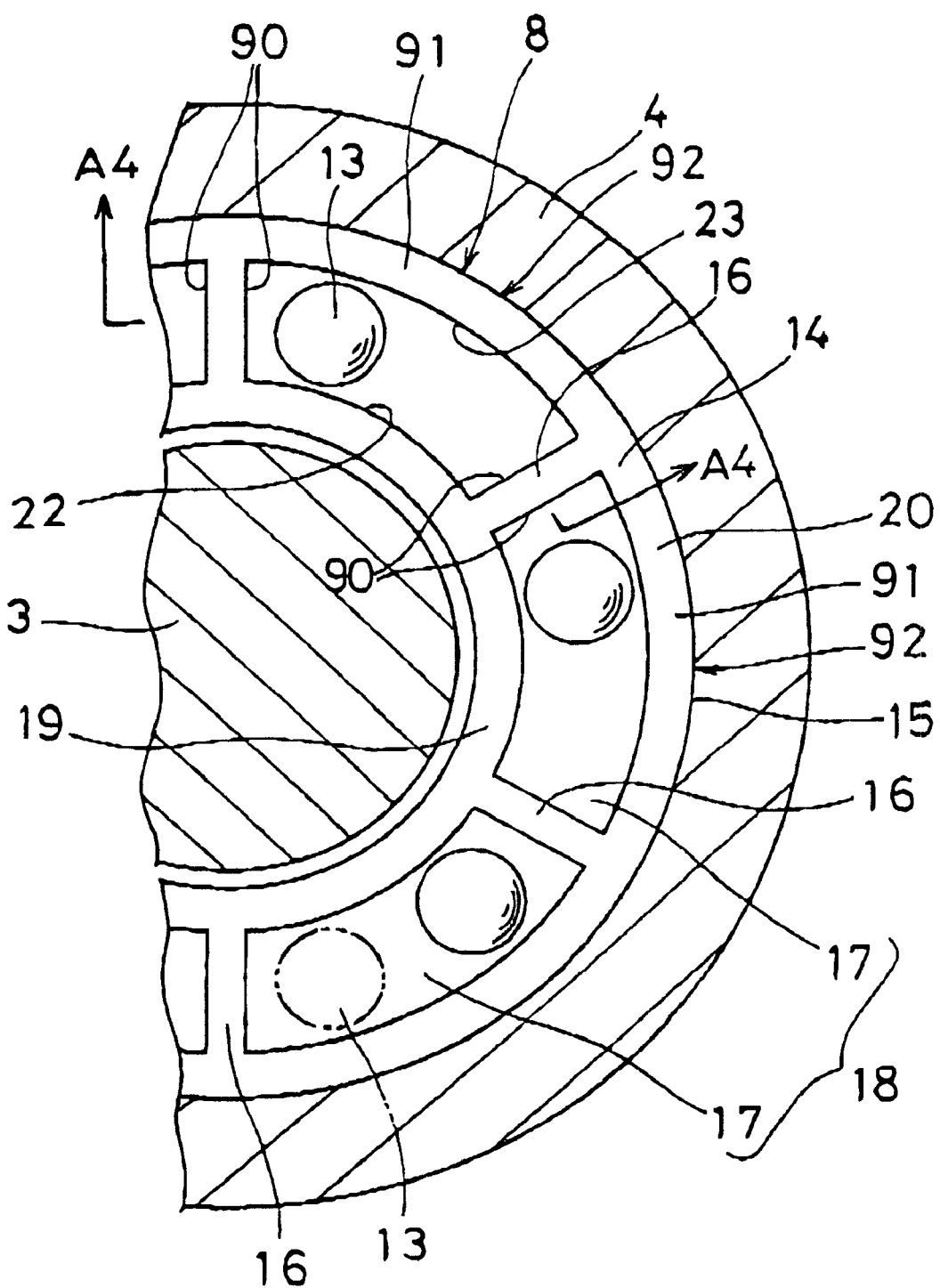
FIG. 3 is a horizontal sectional view of damper part of the bearing device shown in FIG. 16
Figure 4:
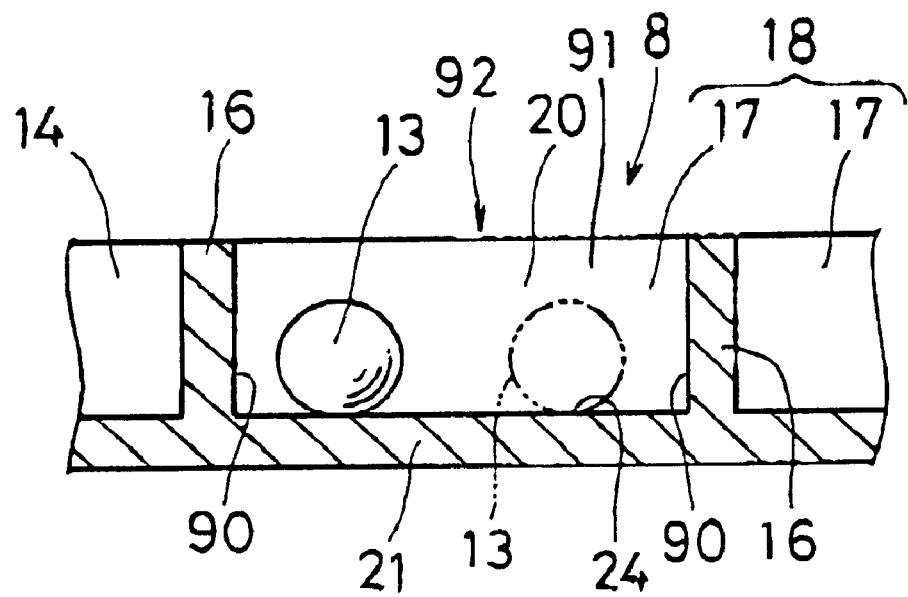
FIG. 4 is a developed sectional view of the damper 8 taken along a line A4—A4 in FIG. 3.

FIG. 3 is a horizontal sectional view of part of each damper 8, and FIG. 4 is a developed sectional view of the damper 8 taken along a circumferential cutting line A4—A4 in FIG. 3. The damper 8 has moving bodies 13 which respectively work as a damping mass. The moving bodies 13 are respectively accommodated in compartments 17 formed on an annular holding member 14. Each moving body 13 is, ball-shape or spherical in this embodiment, moving bodies 13 have the same in shape with each other. The outside circumferential surface 15 of the holding member 14 is fixed to the inside circumferential surface of the sleeve 4. The holding member 14 may be made of metal such as iron or a synthetic resin material, and is rigid.

The holding member 14 has an accommodation structure 18 having a plurality of compartments 17 which are separated from each other by partition walls 16, extend in the circumferential direction, and are open on the top. The holding member 14 has the partition walls 16, an inner circumferential wall 19, an outer circumferential wall 20, and a bottom portion 21. The partition walls 16 are formed integrally with the inner circumferential wall 19, the outer circumferential wall 20, and the bottom portion 21. The plurality of compartment 17 have the same circumferential length, and each compartment 17 accommodates a single moving body 13. Each compartment 91 is composed of a partition wall 16, an inner circumferential wall 19, an outer circumferential wall 20, and a part of the bottom portion 21. The holding member 14 has a plurality of (preferably three or more; six in this embodiment) compartments 91 arranged in the circumferential direction approximately with the same extension. Each damping portion 92 is composed of the compartment 91 and the moving body 13. Therefore, each of the upper and lower damper 9 is provided with a plurality of damping portions 92 which are arranged in the circumferential direction about the axis 5 approximately with the same extension. Each moving body 13 is movable in the circumferential direction in the associated space 17. To this end, the distance between side surfaces 90 of adjacent partition walls is larger than the diameter of the moving body. Each compartment is sector in horizontal section. The outer surface 22 of the inner circumferential wall 19 and the inner surface 23 of the outer circumferential wall 20 are cylindrical and concentric with each other with respect to the axis 5. Surfaces 90 on both sides of each partition wall 16 extend substantially in radial direction. Ideally, the surfaces 90 should extend radially such that their extensions respectively intersect the axis 5. However, from the practical view point the surfaces 90 may be parallel with each other and with a vertical plane extending radially from the axis. The radial interval between the surface. 22 and the surface 23 which form the spaces 17 is larger than the diameter of each moving body 13. Therefore, each moving body 13 can smoothly move in the circumferential direction and in the radial direction in the associated space 17.

Circumferential movement of the moving bodies 13 absorbs circumferential vibration energy of the sleeve 4 about the shaft 3, and radial movement of the moving bodies 13 absorbs radial vibration energy of the sleeve 4. The inner or upper surfaces 24 of the bottom portion 21 are perpendicular to the axis 5 and is horizontal while the bearing device 1of this embodiment is in use. However, the bearing device 1 of this embodiment may be used with the axis 5 being inclined from a vertical line or extending horizontally.

The dampers 8 as described above and shown in FIGS. 11 through 4 absorb vibration energy by friction as the moving bodies 13 move in the damping portions 92. The friction is such as rolling friction and slide friction between the moving bodies 13 and the inside wall surfaces of the holding portions 91, that is, the side surfaces 22, 23, and 90 and the top surfaces 24. In addition, the dampers 8 absorb the vibration energy by collision energy as the moving bodies 13 collide against the inside wall surfaces. This will be described below in more detail.

When the sleeve 4 is vibrating in the circumferential direction, the moving bodies 13 roll on the upper surfaces 24 of the bottom portion 21 and the movements of the moving bodies 13 dissipate the vibration energy of the sleeve 4. The moving bodies 13 also slide on the top surface 24 of the bottom portion 21 and contact the inside surfaces, that is, the side surfaces 22 and 23 and the upper surfaces 24, and resulting friction force dissipates the vibration energy. The moving bodies 13 may collide against partition walls 16, specifically the side surfaces 90, and impacts of such collisions serve as force that offsets the inertia of the sleeve 4 and hence the impacts contribute to stopping of circumferential vibration of the sleeve 4. Since the damping portions 92 which have structures for absorbing vibration energy, are arranged in the circumferential direction with substantially same extension, angular vibration, i.e. the vibration in the circumferential direction of the sleeve 4 is absorbed effectively.

Vibration in radial direction of the sleeve 4 is also absorbed by the damping portion 92. In addition, vibrations of the sleeve 4 in radial directions is attenuated effectively without large differences among absorption effects on and hence attenuation effects in the directions of vibration. Further, since the moving bodies 13 can also move in radial directions, vibration of the sleeve 4 in radial directions can be absorbed effectively as the moving bodies 13 move on the upper surfaces 24 or the side surfaces 90 as well as collide against the side surfaces 22 and 23. Resulting attenuation effects have only small differences in directions and hence are effective.

As a modification of the above mentioned embodiment, a plurality of moving bodies 13 may be accommodated in each space as shown by phantom line in FIGS. 3 and 4. In this case, when circumferential vibration occurs in the sleeve 4, the moving bodies 13 collide with each other and such collisions also dissipate the vibration energy.

Figure 5:
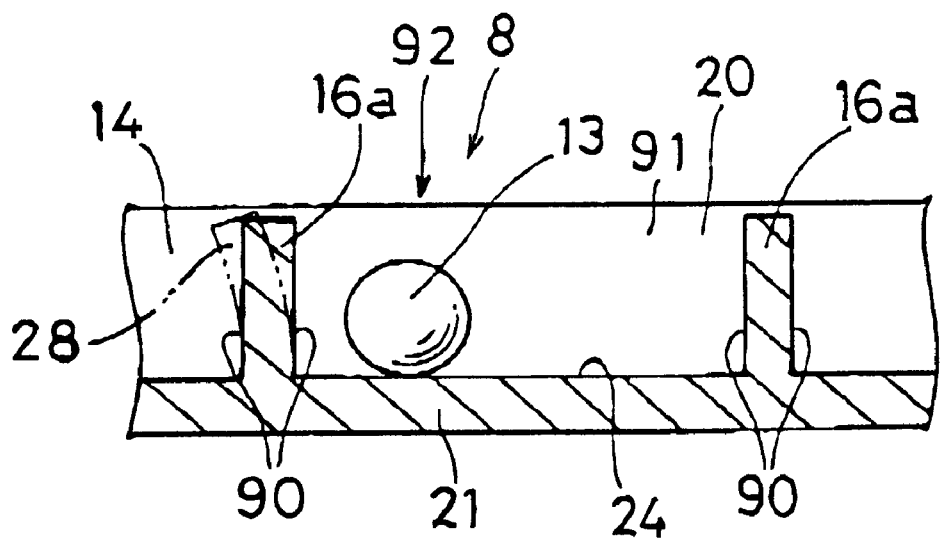
FIG. 5 is a developed sectional view of a part of a holding member 14 according to another embodiment of the invention.
Figure 6:
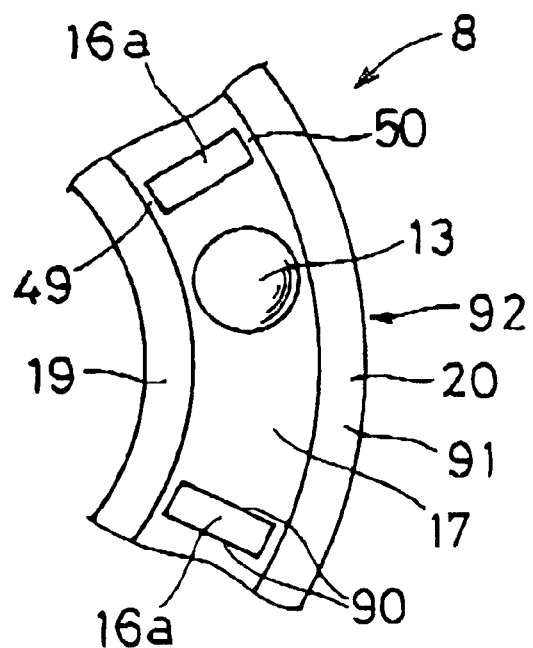
FIG. 6 is a partial plan view of the holding member 14 shown in FIG. 5.

FIG. 5 is a sectional view of a portion of a holding member 14 according to another embodiment of the present invention. This embodiment is similar in its basic structure to the above-described embodiments shown in FIGS. 1 through 4, and the components of this embodiment corresponding to those of the embodiment shown in FIGS. 1 through 4 are given the same reference symbols as those of the latter. FIG. 5 is a same kind of view as FIG. 4. FIG. 6 is a partial plan view of each damper 8 of the embodiment of FIG. 5. A significant feature of this embodiment is that partition walls 16a are flexible or deformable in circumferential direction in the accommodation space 18 of the holding member 14. The base portion of each partition wall 16a extends from and is integral with the upper surface 24 of the bottom portion 21. Gaps 49 and 50 are formed between one side of each partition wall 16a and, the outer surface of the inner circumferential wall 19 and between the other side of the partition wall and the inner surface of the outer circumferential wall 20. The holding member 14 is made of a resilient material, such as a synthetic resin, so that the partition walls 16a can be deformed, that is, bent, said indicated by a phantom line 28 in FIG. 5. When vibration of the sleeve 4 causes the moving bodies 13 to move in the circumferential direction relatively to the holding member 14, in the spaces 17 and collide against the partition walls 16a, the partition walls 16a are resiliently deformed, that is, bent, in the circumferential direction as indicated by the phantom line 28. Such elastic deformation of the partition walls 16a absorbs circumferential vibration energy of the sleeve 4 even more efficiently. The other structures and operations of this embodiment are the same as those of the embodiments shown in FIGS. 1 through 4.

Figure 7:
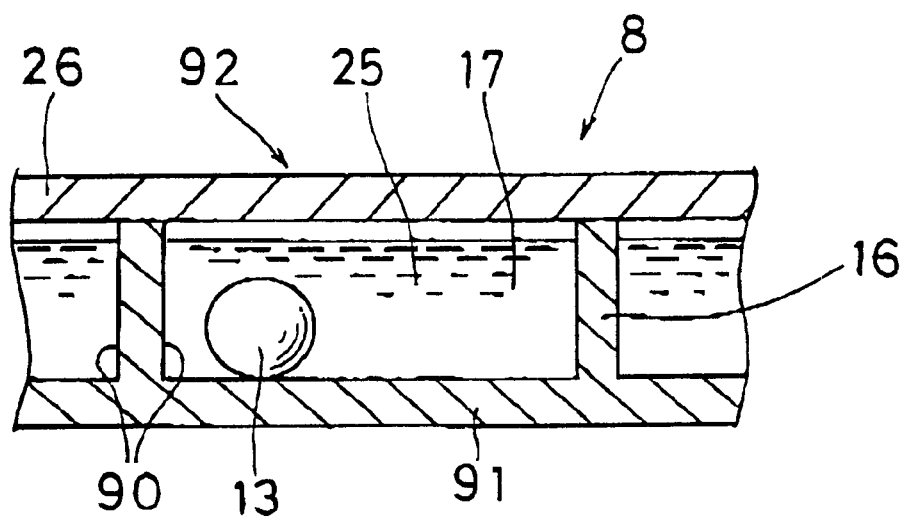
FIG. 7 is a developed sectional view of a part of another embodiment of the invention.

FIG. 7 is a partial vertical sectional view of still another embodiment of the present invention. This embodiment is similar to the embodiment shown in FIGS. 1 through 4 in substance except the structure of each damping portion 92. The components of this embodiment corresponding to those of the embodiment shown in FIGS. 1 through 4 are given the same reference symbols as those of the latter. The significant feature of this embodiment is that a fluid 25 is stored in each hermetically sealed space 17. The fluid 25 may be liquid such as water, silicone oil, or the like. Each moving body 13 are immersed in the fluid 25. An annular lid or cover plate 26 is attached to the top of the holding member 14 to seal the accommodation space or the chamber 18 and prevent the fluids 25 from spilling out of the spaces 17. With this structure, above-mentioned vibration energy is absorbed more efficiently by the contact of the outside surfaces of the moving bodies 13 with the fluids 25 and the movement of the fluids 25 in the spaces 17. The partition walls 16 may be resiliently flexible or deformable like the partition walls 16a shown in FIGS. 5 and 6.

As another embodiment of the present invention, the fluid 25 may be a powder rather than the above-described liquid, or even may be a mixture of liquid and powder. This embodiment can provide the same advantages as in the case of using the liquid as the fluid 25.

Figure 8:
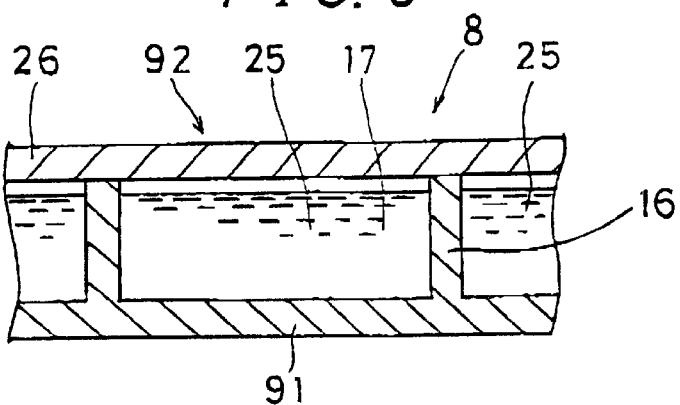
FIG. 8 is a developed sectional view of a part of still another embodiment of the invention.

FIG. 8 is a sectional view of part of yet another embodiment of the present invention. This embodiment is similar to the embodiment shown in FIG. 7 in substance except the structure of each damping portion 92. Components of this embodiment corresponding to those of the embodiment shown in FIG. 7 are given the same reference symbols as those of the latter. In this embodiment, only a fluid 25 is stored in each hermetically sealed space 17 and no moving body 13 is provided. The fluid 25 may be a liquid as described above, a powder, or a mixture of a liquid and a powder. With this structure of each damping portion 92, the fluid 25 instead of the damping mass is held in each compartment 91 of the holding member 14 so that vibration energy as mentioned above is absorbed efficiently as the fluids 25 move in the respective spaces 17.

Figure 9:
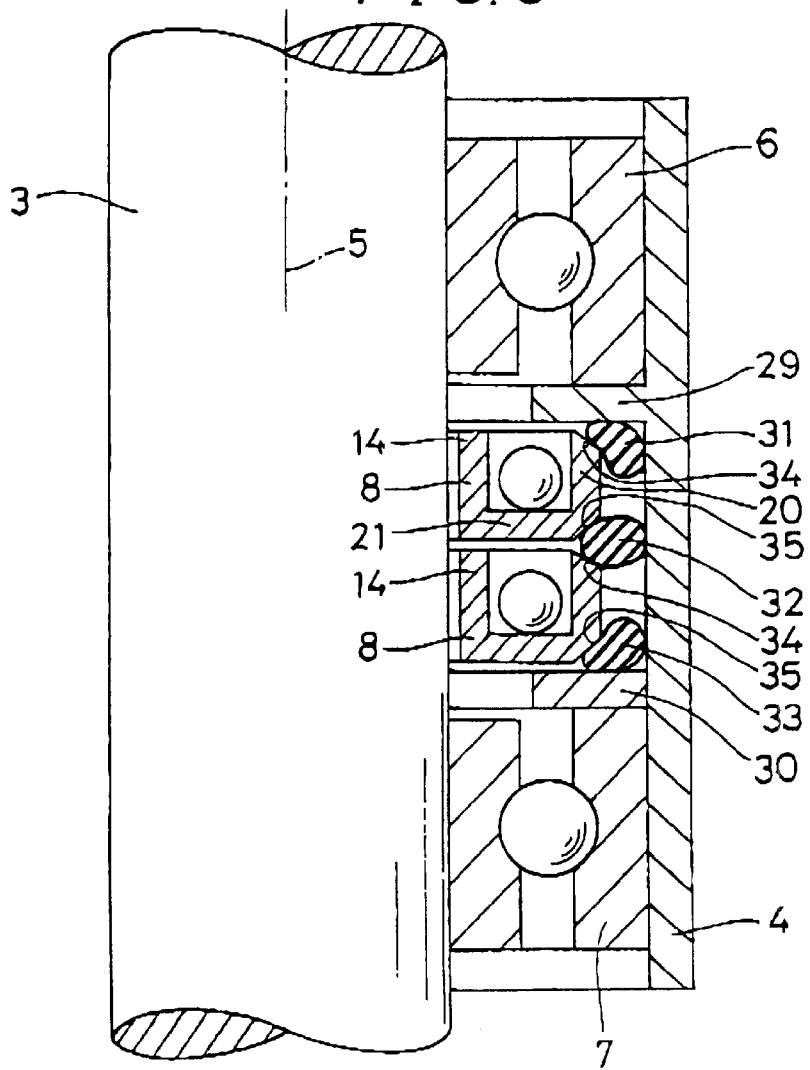
FIG. 9 is a vertical sectional view of a bearing device according to another embodiment of the invention.

FIG. 9 is an enlarged sectional view of bearing structure according to a further embodiment of the present invention. This embodiment is similar to the embodiment shown in FIGS. 1 through 4 except the structure of the damper. This embodiment has a feature that the outside diameter of the outer circumferential wall 20 of the holding member 14 of each damper 8 is smaller than the diameter of the inside circumferential surface of the sleeve 4. The outer circumferential wall 20 and the bottom portion 21 of the holding member 14 of each damper 8 are attached to the sleeve 4 via O-rings as buffer members 31–33 which are made of a resilient material, such as rubber. The outer circumferential wall 20 and bottom portion 21 of the holding member 14 of each damper 8 are formed with inclined support faces 34 and 35, respectively, to support the buffer members 31–33. The holding members 14 which are arranged vertically as seen in FIG. 9 are supported by the buffer member 32 so as not to contact each other. In this arrangement of the holding members, vibration caused to one holding member 14 by vibration of the arm and/or movements of the damping masses, does not directly affect vibration of the other, and every holding members can vibrate freely. Therefore, the holding members 14, can effectively absorb vibration energy. That is, the holding members 14 can vibrate when the sleeve 4 vibrates and the vibration of the holding members 14 can absorb the vibration energy of the sleeve 4.

The buffer members 31–33 allow the holding member 14 to move in the vertical direction as well as in the radial direction, which is perpendicular to the axis 5. This makes it possible to absorb vibration energy not only in the vertical direction but in the radial direction.

Figure 10:
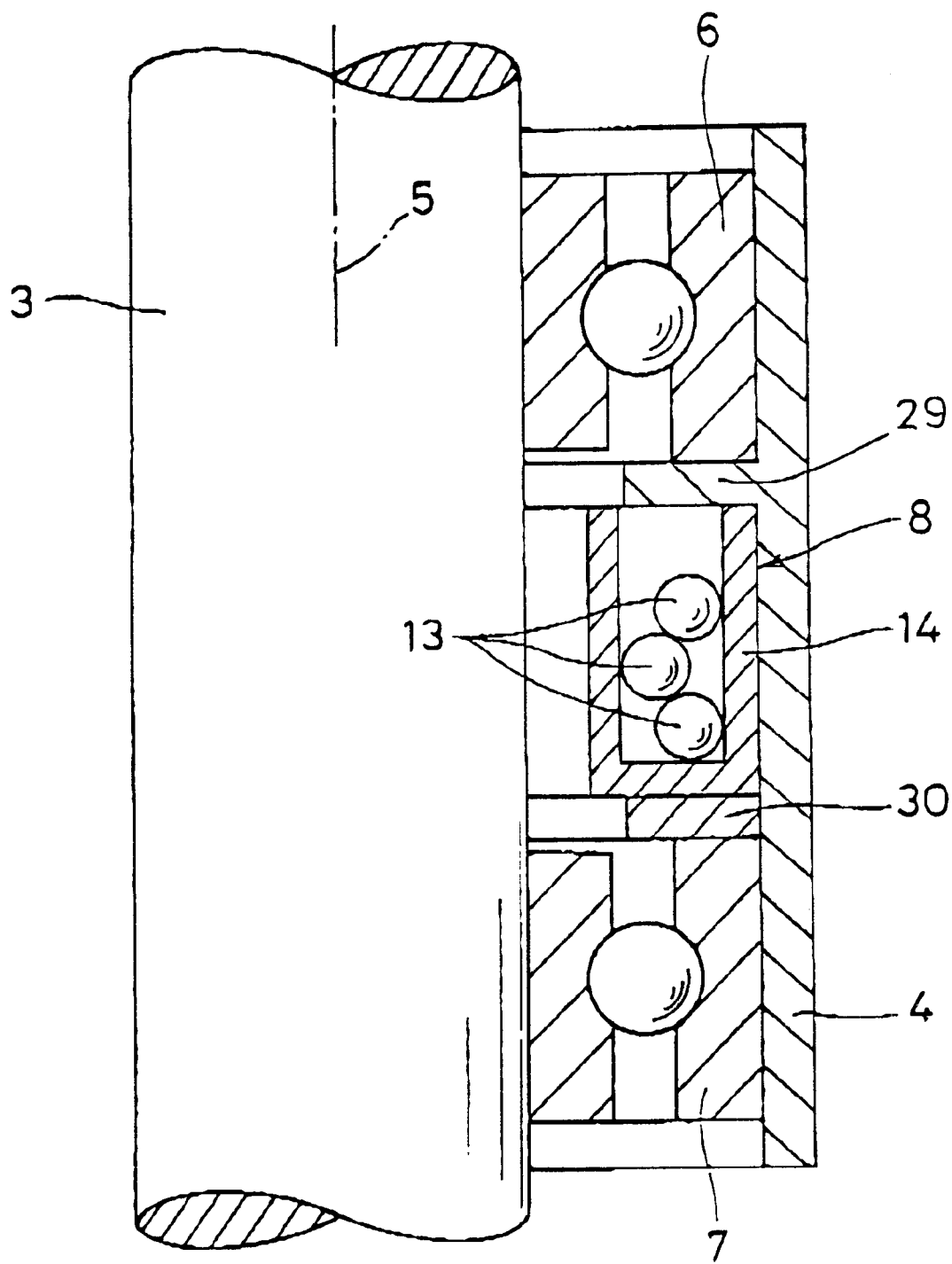
FIG. 10 is a vertical sectional view of a bearing device according to still another embodiment of the invention.

FIG. 10 is a partial vertical sectional view of yet another embodiment of the present invention. This embodiment is similar to the embodiment shown in FIGS. 1 through 4 in substance, except the structure of each damping portion 92. Components of this embodiment corresponding to those of the embodiment of FIGS. 1 through 4 are given the same reference symbols as those of the latter. In this embodiment, a plurality of moving bodies 13 are stacked in one column in the vertical direction in each inner space 17 of the holding member 14. In this manner, many moving bodies 13 may be accommodated in each inner space 17 so, that collisions between those moving bodies 13 absorb vibration energy of the sleeve 4. The other structures of this embodiment are the same as in the embodiment of FIGS. 1 through 4.

Figure 11:
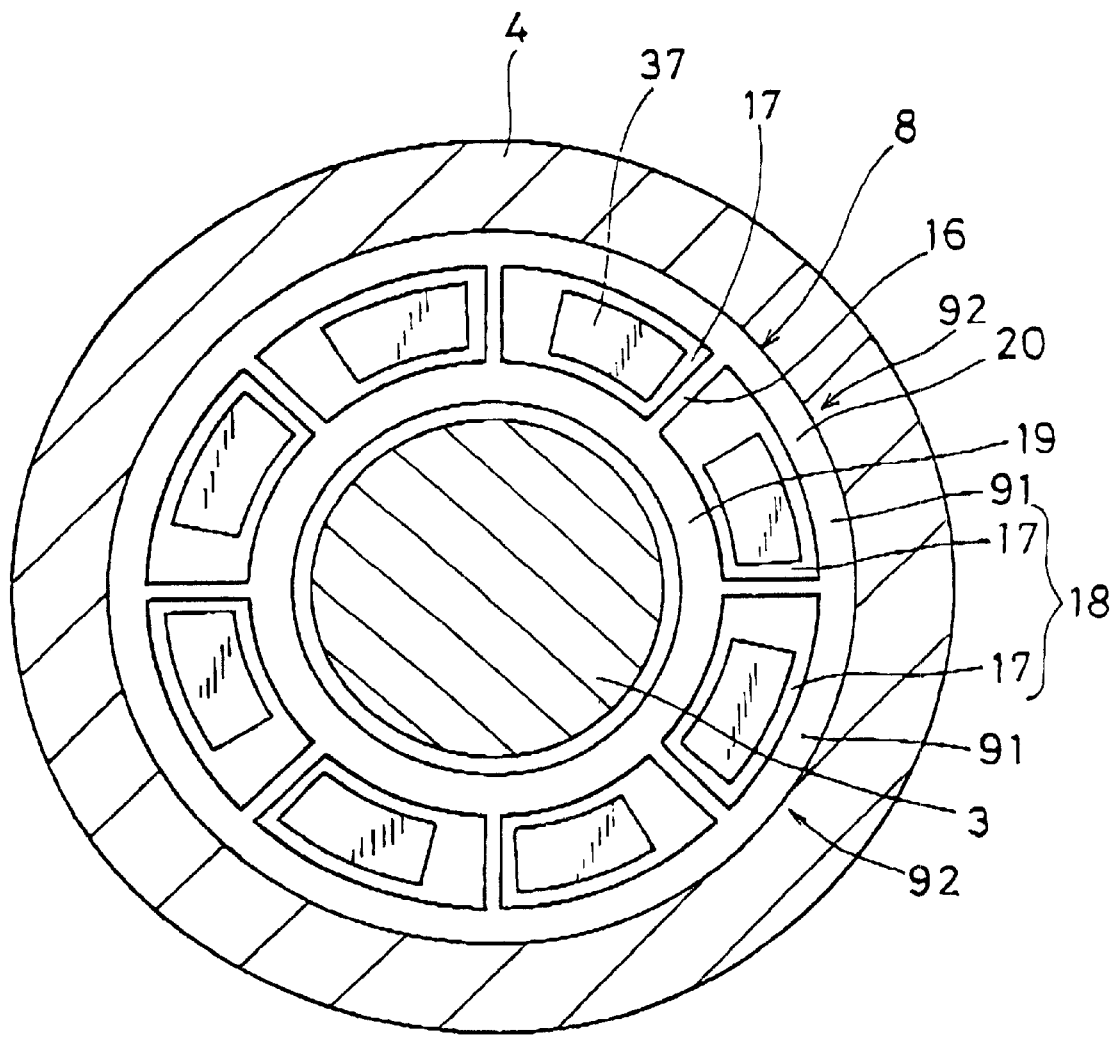
FIG. 11 is a horizontal sectional view of a damper part according to still another embodiment of the invention.
Figure 12:
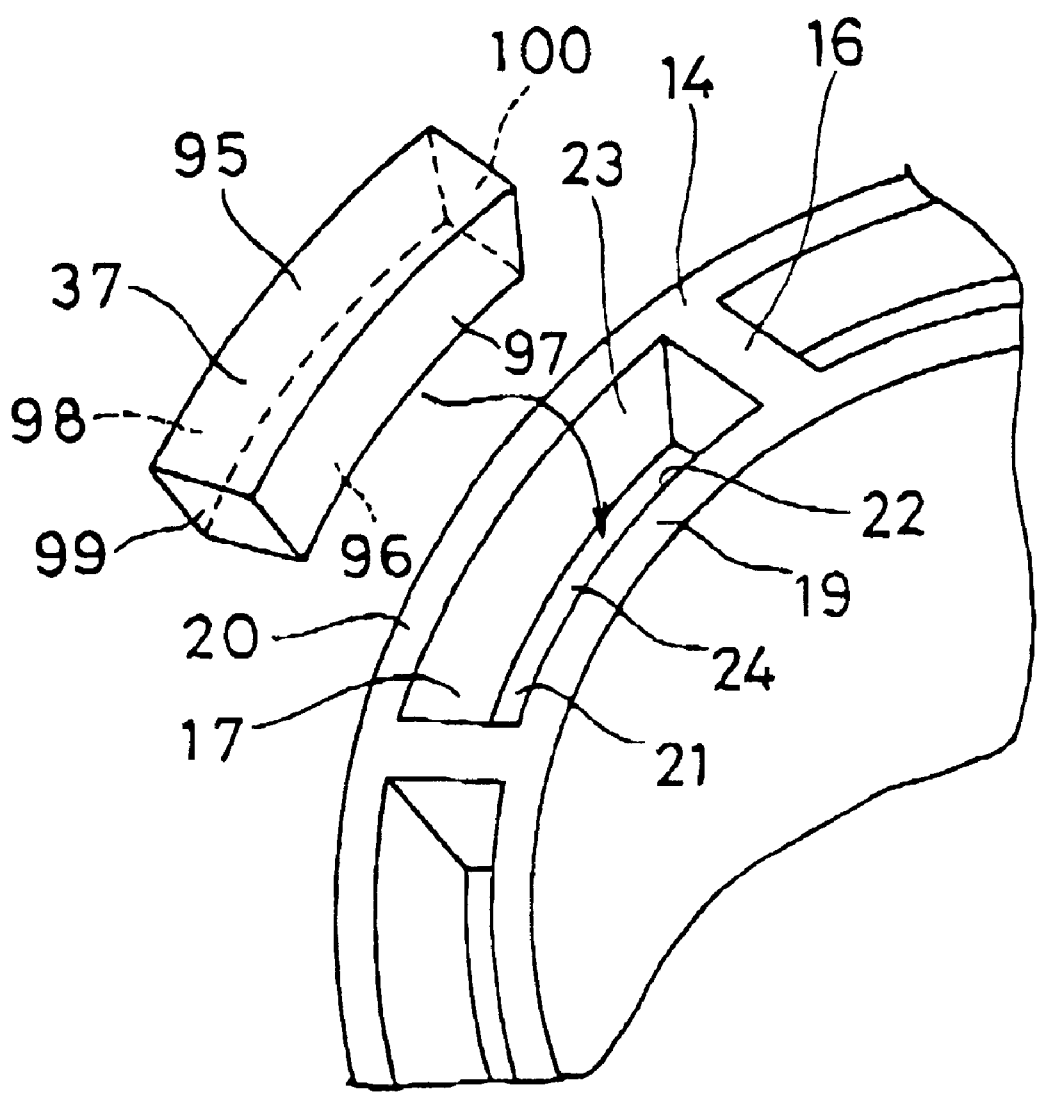
FIG. 12 is a partial perspective view of the holding member of the embodiment shown in FIG. 11.

FIG. 11 is a horizontal sectional view of yet further embodiment of the present invention. FIG. 12 is a partial perspective view of a holding member 14 according to this embodiment with the moving member 37 being shown as being out of space 17 for the convenience of explanation. In this embodiment, the holding member 14 has a structure which is similar to the structure of the holding member 14 shown in FIGS. 1 through 4. In this embodiment, a moving body 37 is sector-shaped in horizontal cross section, long in circumferential direction and short in radial direction. In other words, the moving body 37 is of the shape as a fraction of hollow cylinder. The moving body 37 is accommodated in each space 17 to be movable in the circumferential directions Each moving body 37 has six surfaces, that is, two sector-shaped flat surfaces 95 and 96 which are parallel with each other, two curved surfaces 97 and 98 which are of the shape of fractions of concentric cylindrical surfaces having the axis of the shaft as a center, respectively, and are connected to the surfaces 95 and 96, and two flat end surfaces 99 and 100 which are connected to the surfaces 95–98. The surfaces 99 and 100 are fractions of planes, respectively, which pass through the axis of the cylindrical surfaces respectively including the surfaces 97 and 98. The moving body 37 is accommodated in the associated space 17 in such a manner that its bottom surface 96 is in contact with the upper surface 24. The moving bodies 37 may be made of metal, synthetic resin or rubber, and may be rigid or resilient. Each moving body 37 frictionally contacts the associated upper surface 24 of the bottom portion 21 in the inner space 17 and also frictionally contacts the outer surface 22 of the inner circumferential wall 19 and the inner surface 23 of the outer circumferential wall 20. This makes it possible to effectively dissipate vibration energy of the sleeve 4.

Figure 13:
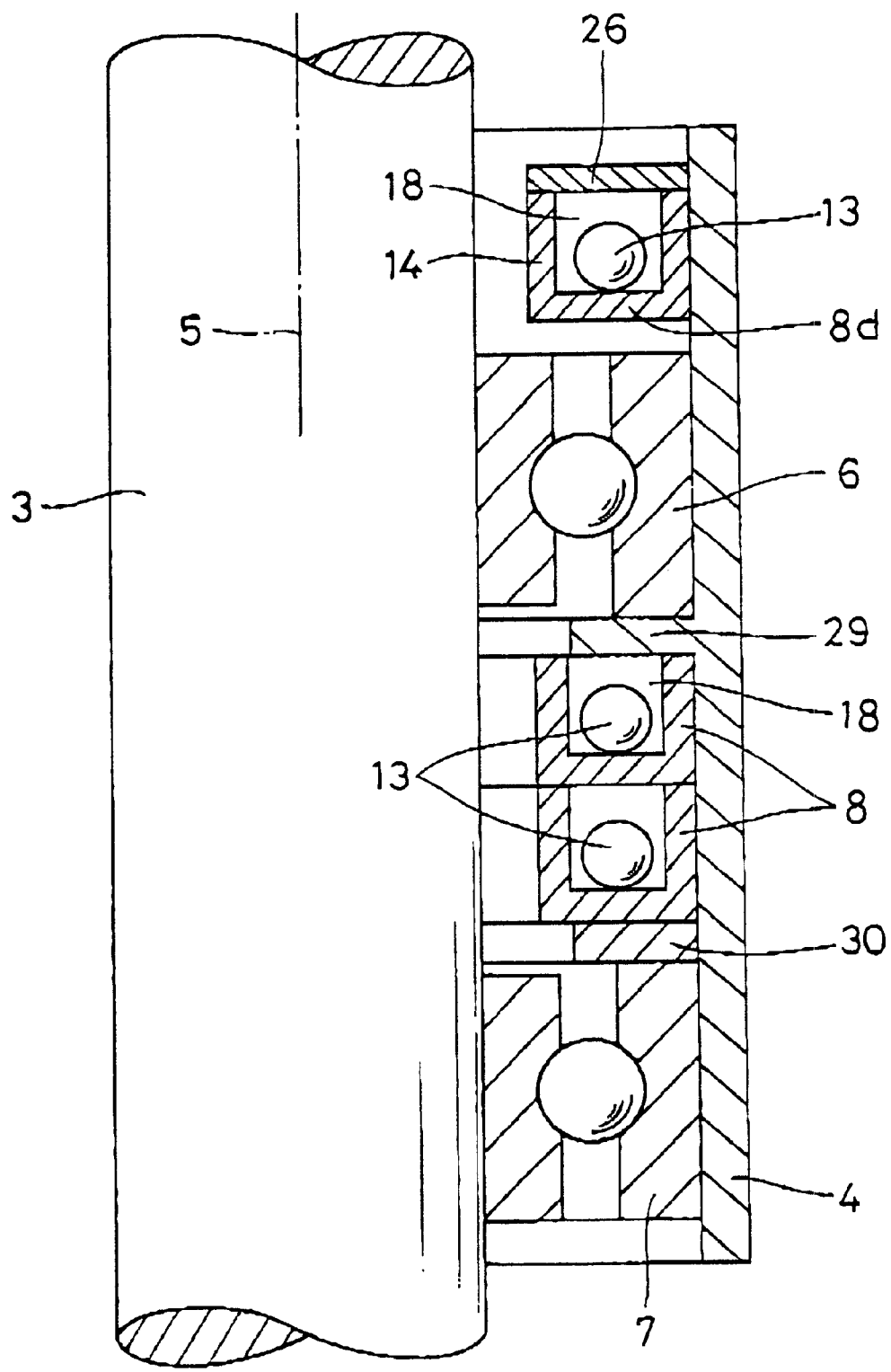
FIG. 13 is a vertical sectional view of the bearing device according to further embodiment of the invention.

FIG. 13 is a vertical sectional view of part of yet another embodiment of the present invention. This embodiment is similar to the embodiment shown in FIGS. 1 through 4 in substance, except additional damper 8d and its associated structure. The components of this embodiment corresponding to the components of the embodiments shown in FIGS. 1 through 4 are given the same reference symbols as those of the latter. In this embodiment, not only are the dampers 8 interposed between the bearings 6 and 7 but also the additional damper 8d is disposed above the upper bearing 6, that is, on the side opposite to the chassis 2 (see FIG. 1). The damper 8d is fixed to the inner surface of the sleeve 4. The damper 8d includes moving bodies 13 and a holding member 14, and is provided with a lid or cover plate 26 to prevent the moving bodies 13 from going out of an accommodation space 18. The lid 26 is attached to the top portion of the holding member 14. That is, in this embodiment, the damper 8d is disposed above the upper bearing 6 to make it possible to absorb vibration energy more effectively. Further, the bottom portion 21 of the holding member 14 of the damper 8d is disposed in close proximity to the bearing 6, whereby oil migration of lubricating oil from the bearing 6 can be prevented by sealing operation of the damper 8b, whereby clean disk drive apparatus is thus formed.

In the embodiments shown in FIGS. 7 through 13, the partition walls 16 may be so configured that they can be moved in the circumferential direction like the partition walls 16a of FIGS. 5 and 6. As a further alternative, the fluid 25 may be stored in each space 17 in the manner shown in FIG. 7.

As another embodiment of the invention, the partition walls 16 or 16a may be omitted.

Figure 14:
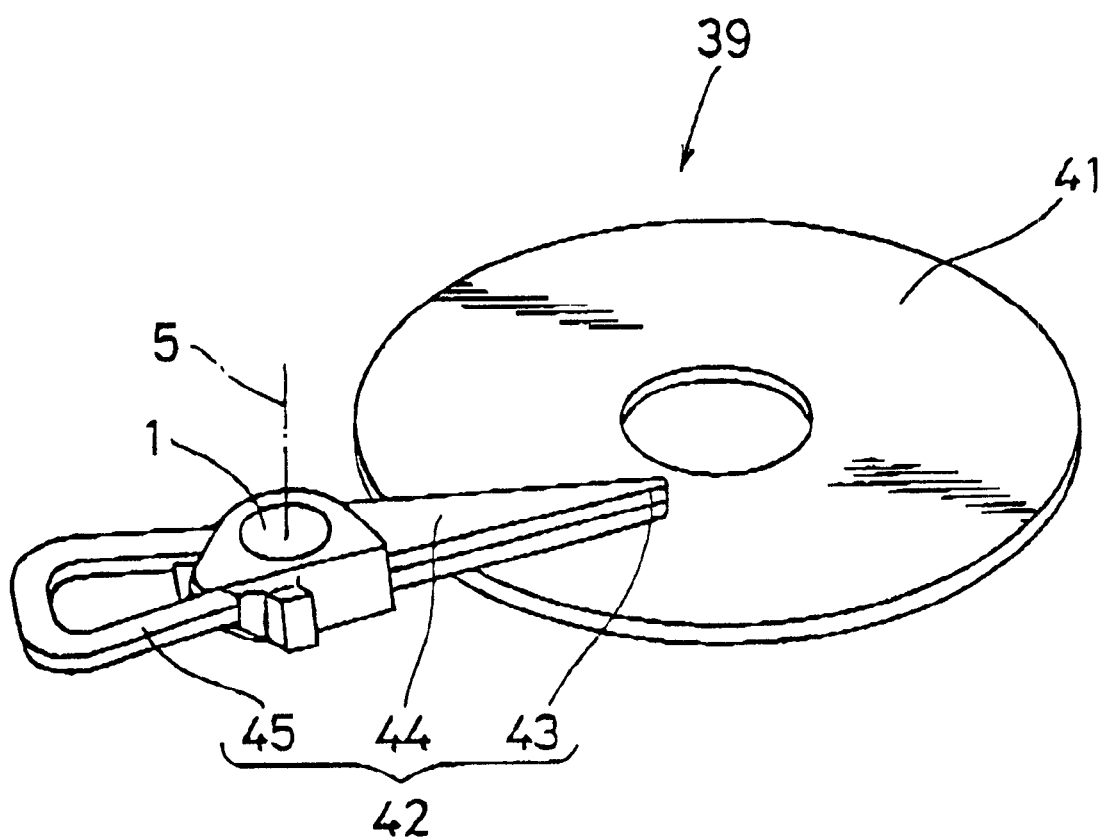
FIG. 14 is a schematic perspective view of a head driving device according to an embodiment of the invention.

FIG. 14 is a schematic perspective view of a head driving device 39 for a disk drive to which the present invention is applied. A head assembly 42 is provided to make access to and read out and/or to write data stored on tracks on the surface of a disk-shaped recording medium 41 such as a hard disk. The disk 41 is rotationally driven by a spindle motor. The heady assembly 42 includes a magnetic head 43 as a conversion element for reading data from and writing data on the disk 41. An arm 44 is attached to a sleeve 4 and is angularly displaceable about the shaft 1. The head 43 is attached at an end of the arm 44, and driving means 45 associated with the other end of the arm 44. The driving means 45 drives the arm 44 to cause its angular displacement. The driving means 45 may be composed of a voice coil fixed to the other end portion of the arm 44 and a permanent magnet which is magnetically coupled with the voice coil and disposed at a fixed position. With the above configuration, the driving means 45 drives the arm 44 to cause its angular displacement with the head 43 being displaced substantially along the radial direction of the disk 41 to reach a desired track.

Vibration which is caused by high-speed angular displacement of the arm 44 is absorbed by the above-described dampers 8 which are attached to the sleeve 4 of the bearing device 1, whereby the stabilization time of an angular displacement positioning operation cat be shortened and the resonance amplitude of vibration of the head assembly 42 can be reduced. The bearing device 1 may be one according to any of the embodiments of FIGS. 1 through 13.

Figure 15A:
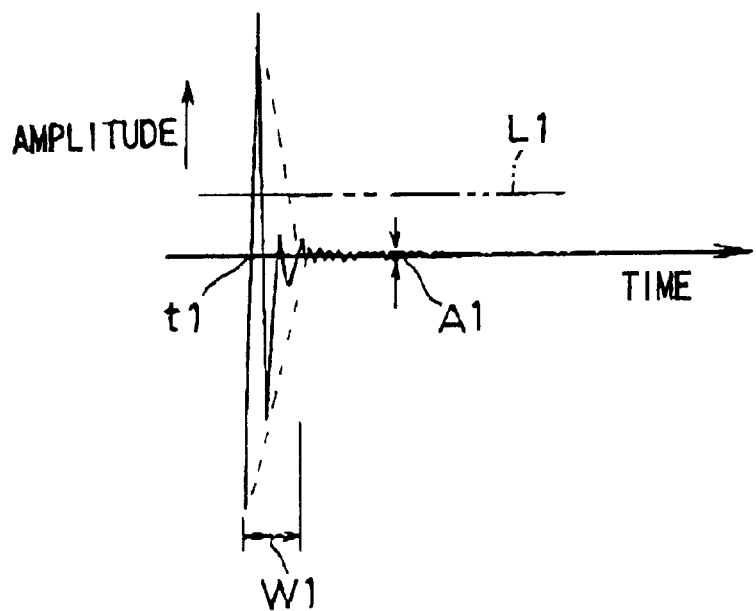
FIGS. 15A and 15B are graphs showing damping of circumferential vibration of a sleeve.
Figure 15B:
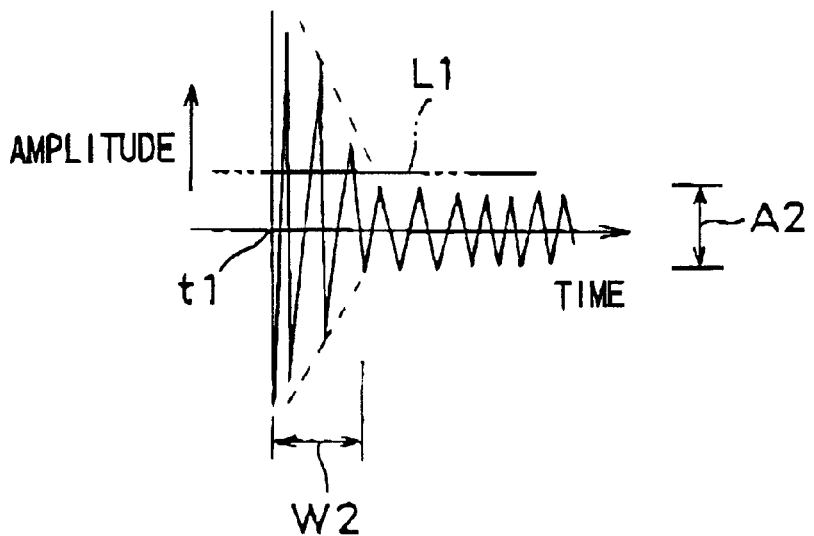

FIGS. 15A and 15B show how circumferential vibration of the sleeve 4 attenuates. FIG. 15A shows a characteristic which is obtained when vibration energy is attenuated by using the bearing device 1 of FIGS. 1 through 4 in the head driving device 39 for a disk drive shown in FIG. 14. After the head assembly 42 reached a desired track of the disk 41 at time t1, the amplitude of vibration reaches a predetermined low level L1 as an allowable amplitude after a lapse of a relatively short time W1. The amplitude A1 of residual vibration can be suppressed to a very small value in contrast with the configuration having no damper of the present invention a time period W2 shown in FIG. 15B which is taken from the time t1 when the head 43 reaches a desired track of the disk 41 to a time when the amplitude reaches the predetermined level L1 is longer than the time W1 shown in FIG. 15A. Further, the amplitude A2 of residual vibration which is larger than the amplitude A1 shown in, FIG. 15A thereafter continues for a relatively long time. As such, the dampers according to the present invention can effectively absorb circumferential vibration energy of the sleeve 4 and hence that of the head assembly 42. To obtain such a good characteristic, it is necessary to properly select or set a mass, ratio $\mu$, an amplitude ratio $\kappa$ and a coefficient e, etc. The mass ratio $\mu$ is a proportion of a mass of moving bodied in the damper of the present invention, to a mass of the arm 44 and the head 43. The amplitude ratio visa proportion of a vibration amplitude of the moving body to a gap between a moving body and corresponding walls in the damper. The coefficient is at rebound ratio between the moving body and the corresponding walls bounded by the moving body.

FIG. 16 is a graph showing a characteristic of the embodiment which has been described above in connection with FIG. 15A. The amplitude of vibration of the head assembly 42 can be controlled to a relatively small value as indicated by a line 46 over a wide frequency range by selecting the materials of the moving body and the wall bounded by the moving body so that the coefficient e of rebound falls within an optimum range of e=0.2–0.3. In contrast, in the conventional configuration described above in connection with FIG. 15B that the dampers are not provided, a large amplitude occurs during resonance as indicated by a line 47. By using the dampers of the present invention, the amplitude during resonance can be suppressed to a small value, whereby the processing characteristics of the disk drive can greatly be improved.

Next, the embodiments of a second group of the present invention will be described with reference to FIGS. 17 through 40.

Figure 17:
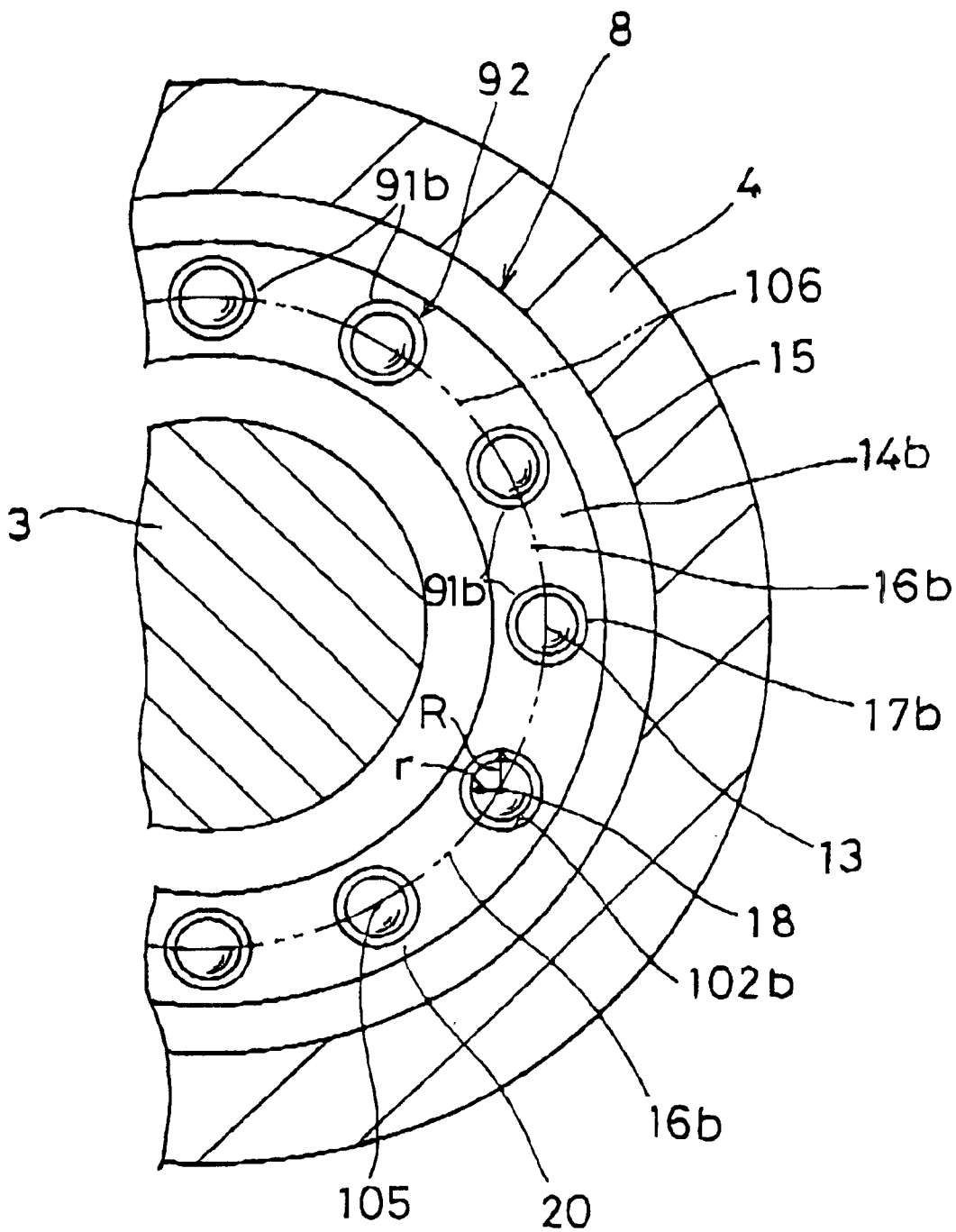
FIG. 17 is a horizontal sectional view of a holding member 14b according to a further embodiment of the invention.

A first embodiment of the second group of the present invention will be described below with reference to FIGS. 17 through 24. This embodiment is similar to the above-described embodiment shown in FIG. 3 in basic configuration. Components of this embodiment corresponding to the components of the embodiment of FIG. 3 are given the same reference symbols as those of the latter. FIG. 17 is an enlarged sectional view of a portion of a bearing device 1 for a disk drive.

A pair of dampers 8 are vertically arranged in juxtaposed manner in the same way as that of the embodiment shown in FIG. 3. Each damper 8 has moving bodies 13 and an annular or ring shape holding member 14b. Each moving body 13 is, for example, spherical in this embodiment and the plurality of moving bodies 13 have the same shape. The outside circumferential surface 15 of the holding member 14b is fixed to the inside circumferential surface of the sleeve 4. The holding member 14b may be made of metal such as iron, a synthetic resin material or rubber, and is rigid.

A plurality of cylindrical recesses 91b, (e.g., twelve recesses in this embodiment) are formed in the holding member 14b to serve as a holding portion. The vertical axes 105 of the cylindrical recesses 91b are on an imaginary circle 106 which is concentric with the stationary shaft 3 and the sleeve 4 with respect to the axis 5. The recesses 91b are arranged at substantially equal intervals along the imaginary circle 106. A cylindrical space 17b is defined by the inside wall surface 102b of each recess 91b. That is, the inside wall surface 102b, of each recess 91b has a central axis 105 which is parallel with the axis 5 of the stationary shaft 3. The cross sections of the wall surfaces 102b taken perpendicularly to the axis 105, are circles in shape which are uniform along the axis 105. The space 17b is partitioned by partition walls 16b.

A single moving body 13 is accommodated in the space 17b of each recess 91b. A relationship R>r holds where R represents the radius of the inside wall surface 102b of each recess 91b and r denotes the radius of the outer surface of each moving body 13 The difference between the radii R and r is small. The moving bodies 13 have a spherical outer shape. The moving bodies 13 may be either solid or hollow.

The other structures of this embodiment are the same as that of the above mentioned embodiments of the first group. When the sleeve 4 vibrates in the circumferential direction and in the radial direction, the moving bodies 13 move in the circumferential and radial direction in the respective spaces 17b and can thereby absorb the vibration energy. That is, the holding portion 91b and the moving body 13 constitute a damping portion 92. The other structures of this embodiment are the same as that of the embodiments shown in FIGS. 1 through 4.

In the embodiment of FIG. 17, since the difference between the radii R and r is small, for example, about 0.05 mm, the moving bodies 13 easily move and collide with the inside wall surfaces 102b when the sleeve 4 vibrates in the circumferential direction about the axis 5. Vibration energy is absorbed and dissipated efficiently by those collisions. The moving bodies 13 may roll or slide in on the wall surface 102b such that they are in frictional contact with the wall surfaces 102b to circulate about the axis 18. These circulating movements also contribute to absorption and dissipation of the vibration energy. Since the damping portions 92b for attenuating such vibration are arranged circumferentially at substantially equal intervals, circumferential vibration of the sleeve 4 can be attenuated uniformly and effectively. Further, the moving bodies 13 easily move in radial directions of the sleeve 4 to collide with the inside wall surfaces 102b. Therefore, when the sleeve 4 vibrates in a radial direction, the moving bodies 13 collide with the inside wall surfaces 102b and can thereby absorb and dissipate the radial vibration energy effectively. Movements of the moving bodies 13 in frictional contact with the inside wall surfaces 102b can also absorb and dissipate vibration in a radial direction. In this manner, vibration of the sleeve 4 in the radial direction can be attenuated effectively without large differences among attenuation effects in the vibration directions.

FIG. 16 is a horizontal sectional view showing a holding member 14c according to another embodiment of the present invention. This embodiment is substantially similar to the embodiment of FIG. 17 except the structure of holding member 14C. Components of this embodiment corresponding to the components of the embodiment shown in FIG. 17 are given the same reference symbols as those of the latter. As also shown in FIG. 19, each space 17c formed in the holding member 14c has a substantially cylindrical shape and opens upward and has a bottom. The spaces 17c are separated from each other in the circumferential direction by partition walls 16c. Each space 17c opens inward in the radial direction by a cut 107, which is a significant feature of the embodiment shown in FIG. 18. Each spherical moving body 13 is placed on the upper surface 24 of the bottom portion 21 and accommodated in the associated space 17c.

Figure 18:
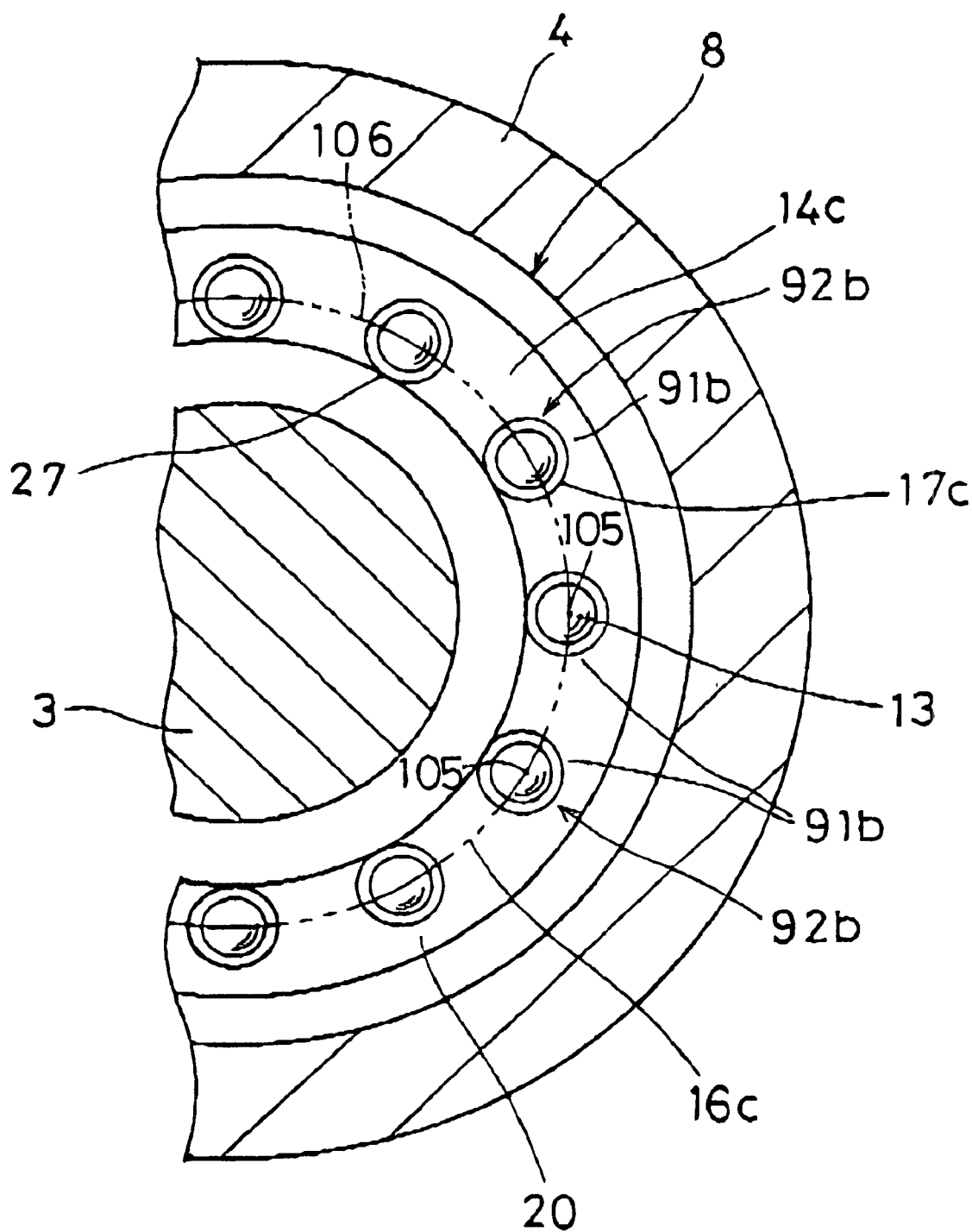
FIG. 18 is a horizontal sectional view of a holding member 14c according to yet another embodiment of the invention.
Figure 19:
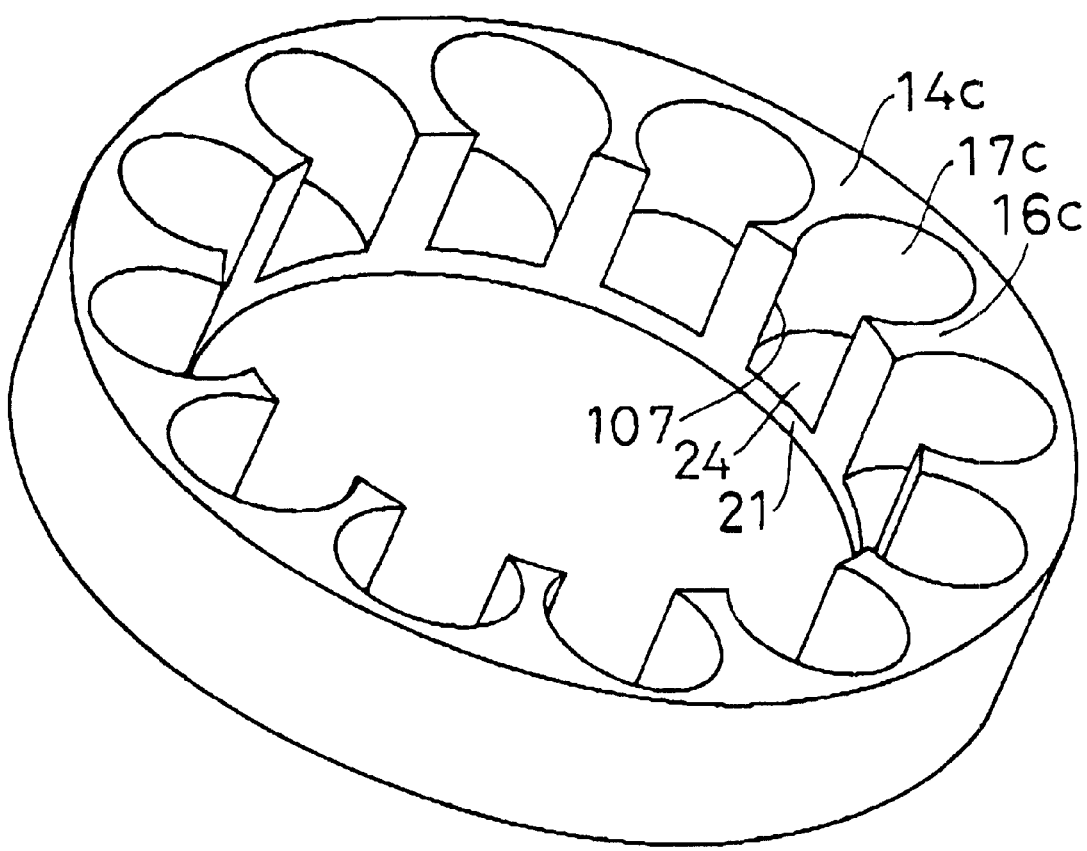
FIG. 19 is a perspective view of the holding member shown in FIG. 18.

In the embodiment shown in FIGS. 18 and 19, by virtue of the cuts 107, the moving bodies 13 move in a large extent also in the radial direction in the respective spaces 17c and hence can also absorb radial vibration energy of the sleeve 4 more effectively. Since the dimension of each cut 107 in the, Circumferential direction is smaller than the outside diameter of each moving body 13, the moving bodies 13 do not go out through the cuts 107.

Figure 20:
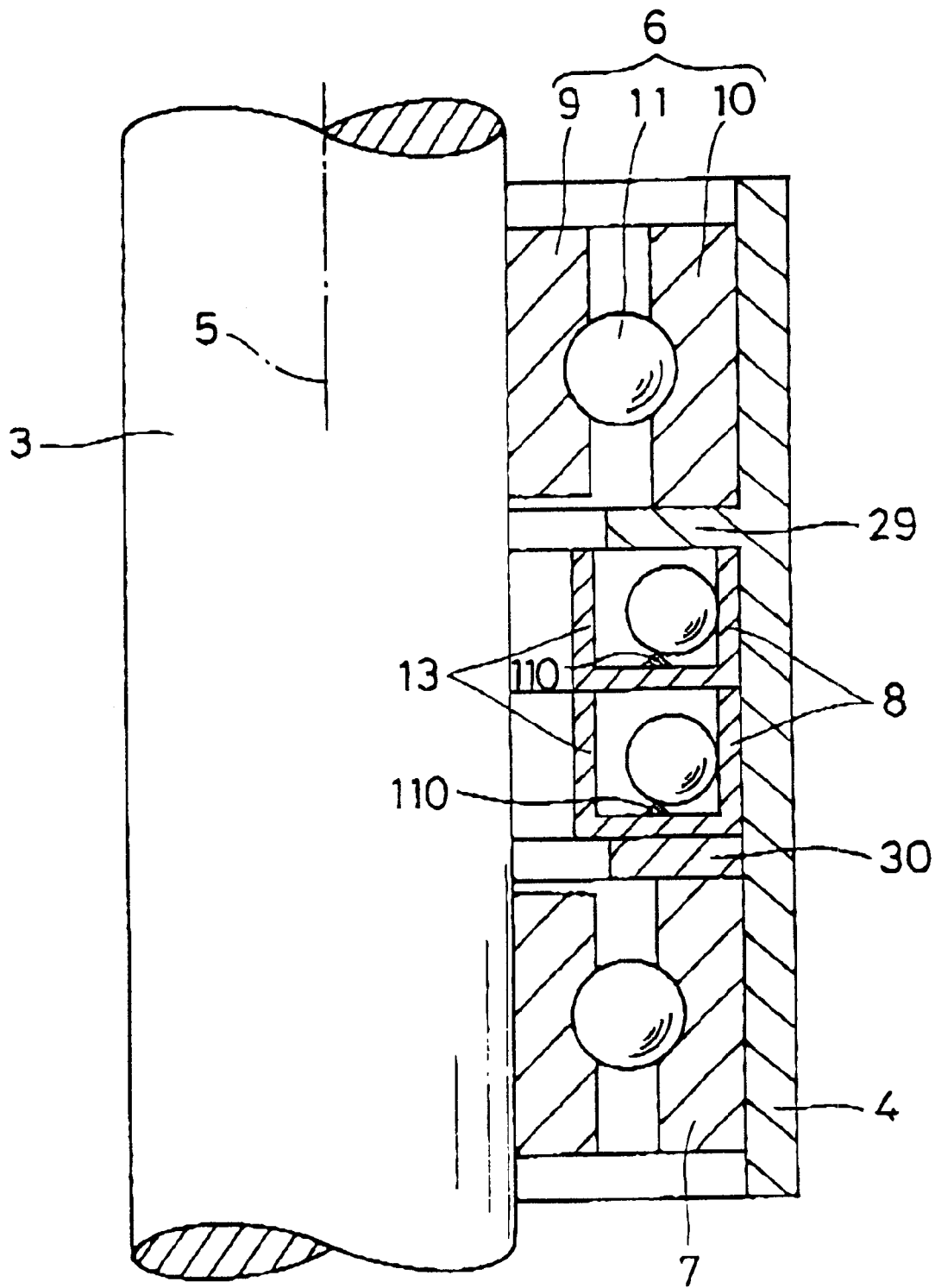
FIG. 20 is an enlarged vertical sectional view of a further modified bearing device for a disk drive shown in FIG. 1.
Figure 21:
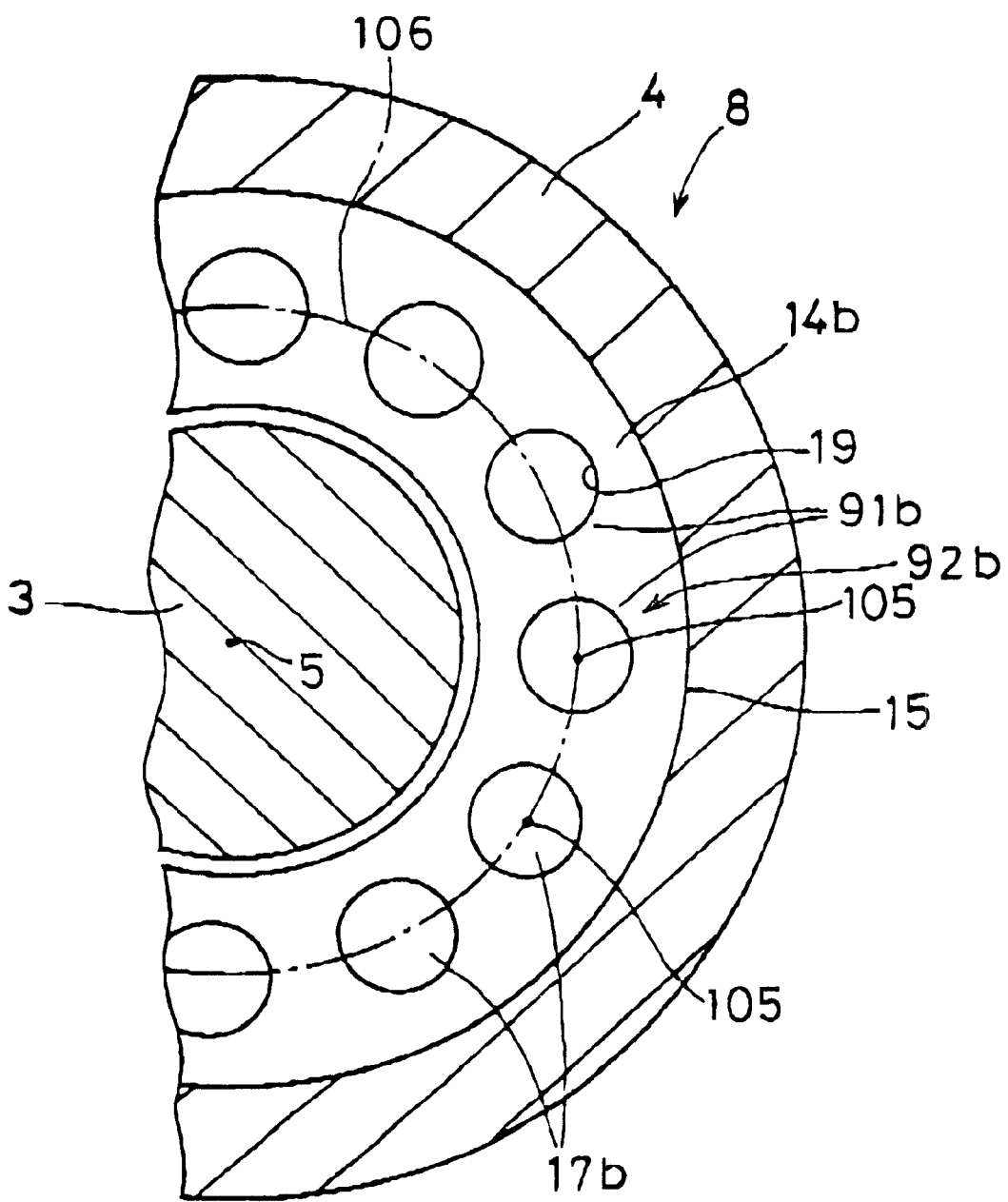
FIG. 21 is a horizontal sectional view of a damper for the bearing device shown in FIG. 20.
Figure 22:
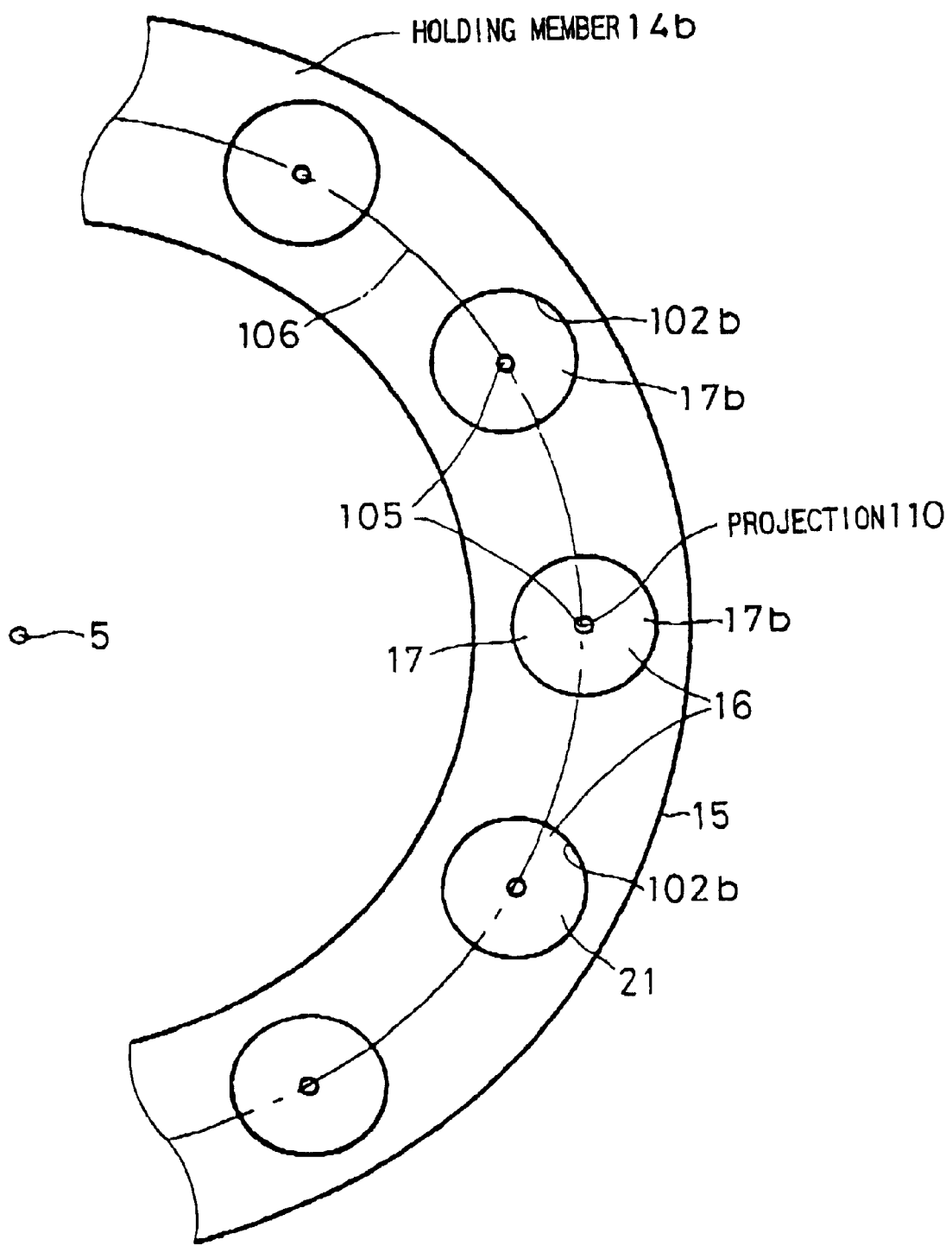
FIG. 22 is a schematic enlarged plan view of a part of a holding member shown in FIG. 21.
Figure 23:
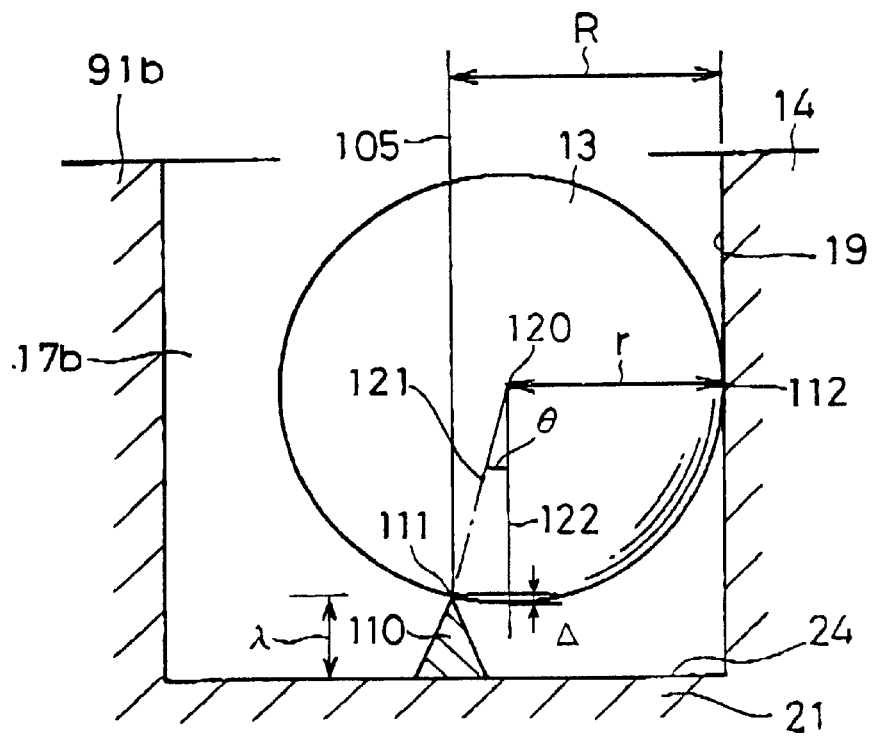
FIG. 23 is an enlarged vertical sectional view of each recess shown in FIG. 22.
Figure 24:
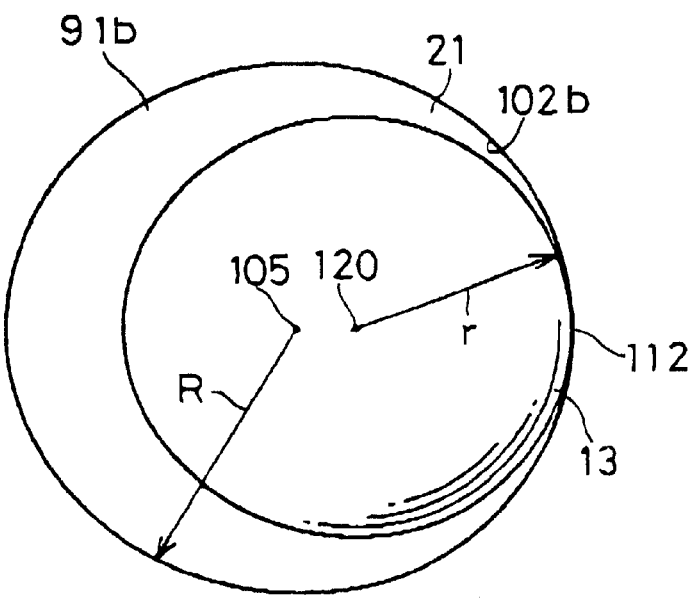
FIG. 24 is a schematic illustration showing geometric relationship of the recess, and a moving body.

FIG. 20 is a partial enlarged sectional view of a bearing device 1 for a disk drive having dampers 8 according to still another embodiment of the present invention. FIG. 21 is a partial horizontal sectional view of one of the dampers 8 shown in FIG. 20. FIG. 22 is a schematic enlarged plan view of a portion of a holding member 14b which constitutes one of the dampers 8 shown in FIG. 20. FIG. 23 is an enlarged sectional view of a recess 92b. FIG. 24 is an illustrative enlarged plan view of the recess 92b. This embodiment is similar to the embodiment of FIG. 17 in basic configuration, and components of this embodiment corresponding to the components of the embodiment shown in FIG. 17 are given the same reference symbols as those of the latter. In this embodiment, a sharpened projection 110 is formed on the upper surfaces 24 of the bottom portion 21 of each recess 91b. The projection 110 is so formed as to be rotationally symmetrical about the axis 105. For example, the projection 110 has a conical whose axis coincides with the axis 105. The projection 110 supports the moving body 13 with a single point contact with the moving body 13 at the apex 111 of the projection 110. The outside surface of the moving body 13 is in point contact with the inside wall surface 102b of the recess 91b at a position indicated by reference symbol 112. In this manner, the moving body 13 is held in an extremely unstable state in which it is in point contact with the inside wall surface 102b and the projection 110.

Figure 25A:
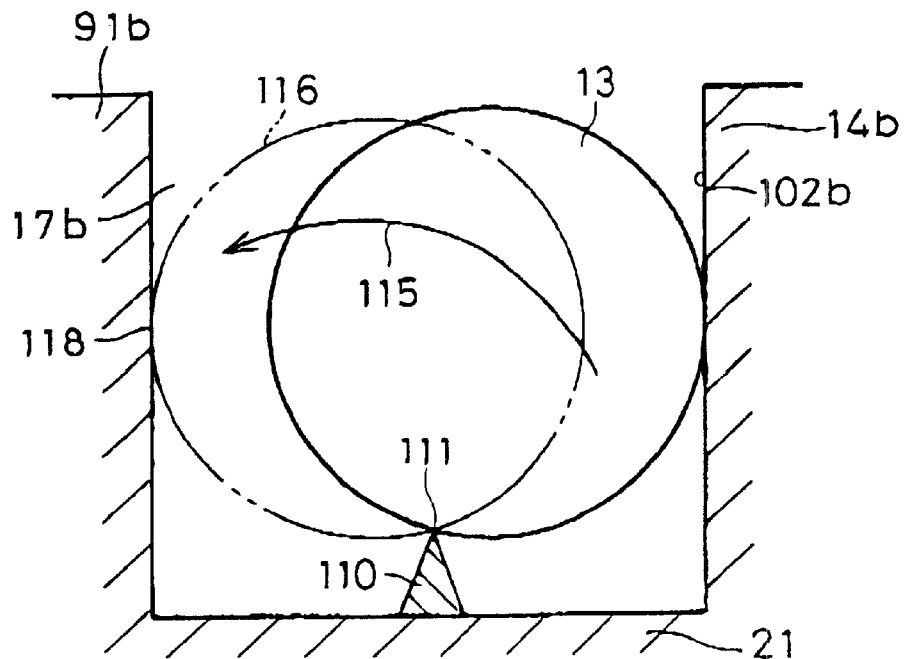
FIGS. 25A and 25B are schematic illustrations showing the movement of a moving body in a space of the recess.
Figure 25B:
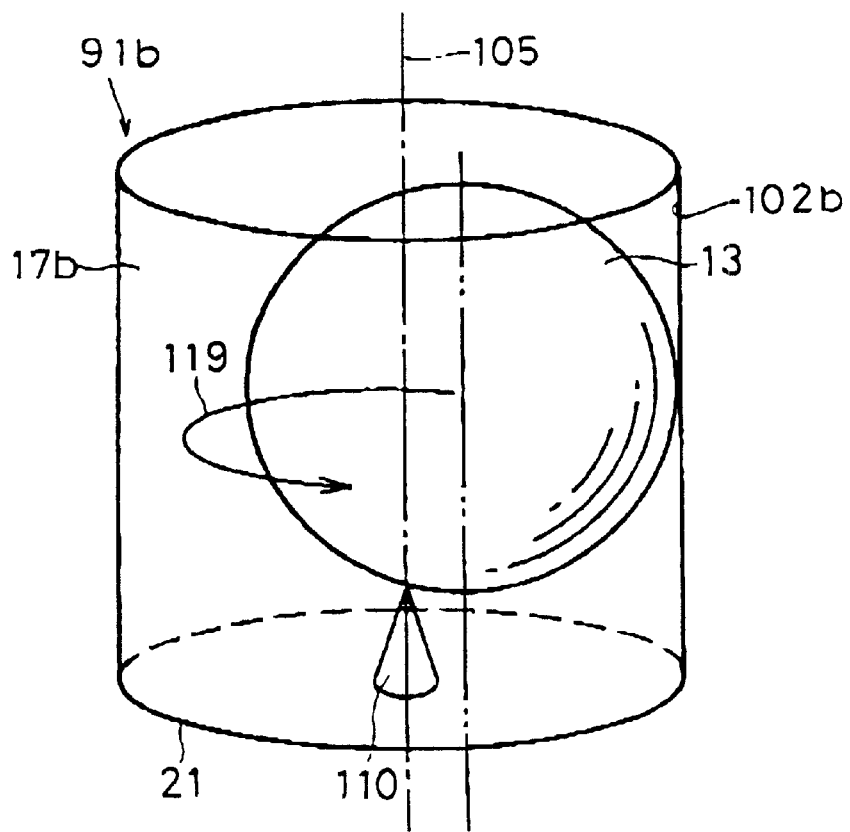

FIGS. 25A and 25B are simplified illustrations showing how the moving body 13 moves in the space 17 of each recess 91b. When circumferential vibration about the axis 5 occurs with. the sleeve 4 and hence in the holding member 14, as shown in FIG. 25A the moving body 13 goes over the apex 111 of the projection 110 as indicated by arrow 115 and collides against the inside wall surface 102b at a different position 118 as indicated by an imaginary line 116. The impact of this collision effectively absorbs and dissipates the vibrations energy of the sleeve 4.

Alternatively, when circumferential vibration occurs in the sleeve 4 similarly as in the case of the above mentioned, embodiments, the moving body 13 rolls on the inside wall surface 102b of the recess 91b while frictionally contacting the inside wall surface 102b with the moving body 13 being in point contact with the projection 110 as indicated by arrow 119 in FIG. 25B. Such rolling movement of the moving body 13 also absorbs and dissipates the circumferential vibration energy of the sleeve 4 and suppress the vibration.

When the sleeve 4 vibrates in a radial direction, the vibration energy can be absorbed and dissipated in the same manner as it vibrates in the circumferential direction. Very small vibration can be attenuated because the moving bodies 13 are supported in a very unstable manner.

As shown in FIG. 25A, when vibration such as a circumferential vibration about the axis 5 occurs with the sleeve 4, the moving body 13 consumes positional energy as it removes vertically in such a manner as to go over the projection 110. It is necessary to minimize the vertical displacement $\Delta$ of the moving body 13 which is to consume positional energy.

$$\Delta = r(1 - \cos \theta) \tag{1}$$

The angle $\theta$ is formed by a straight line 121 which connects the center 120 of the moving body 13 shown in FIG. 23 and the apex 111 of the projection 110 which is in point contact with the moving body 13 and a vertical line 122 passing through the center 120. A value of the angle $\theta$ which makes $\Delta/r$ smaller than 1%, for example, is determined in the following manner.

$$\Delta/r = 1 - \cos \theta \approx \tfrac{1}{2}\theta^2 < 0.01 \tag{2}$$

$$\therefore \ \theta < \frac{\sqrt{2}}{10} = 0.142 \text{ (rad)} \tag{3}$$

Now, since $$\sin\theta = \frac{R - r}{r} \approx \theta \tag{4}$$

the relationship is obtained.

$$\frac{R - r}{r} < 0.142 \tag{5}$$

$$\therefore \ R < 1.142 r \tag{6}$$

Since r<R holds, $$1 < \frac{R}{r} < 1.142 \tag{7}$$

or $$1 < \frac{D}{d} < 1.142 \tag{8}$$

is obtained as a rough range.

In Inequality (8), D represents the diameter of the inside wall surface 102b of the recess 91b (D=2R) and d represents the outside diameter of the moving body 13 (d=2r). Assuming that D=1.1 mm and d=1.0 mm, by for example, then $$\frac{D}{d} = 1.1 < 1.142 \tag{9}$$

To prevent the moving body 13 from contacting the top surface 24 of the bottom portion 21, it is necessary that the height $\lambda$ of the projection 110 satisfy a relationship $$\lambda > \Delta \tag{10}$$

There is a relationship $$\frac{\lambda}{2r} = \frac{\lambda}{d} > \frac{1}{4}\theta^2 \qquad (11)$$

Considering $$1 < \frac{D}{d} < 1.142 \qquad (12)$$

and $$\frac{1}{2}\theta^2 < 0.01 \qquad (13)$$

Equation (11) is modified as follows:

$$\frac{\lambda}{d} = \frac{\lambda}{D} \times \frac{D}{d} > \frac{\lambda}{D} > \frac{0.01}{2} > \frac{1}{4}\theta^2 \qquad (14)$$

That is, $$\frac{\lambda}{D} > 0.005 \qquad (15)$$

The height $\lambda$ of the projection 110 is determined so as to satisfy Inequality (15). For example, when $\lambda=0.05$ mm and D=1.1 mm, $$\frac{\lambda}{D} = 0.045 > 0.005 \qquad (16)$$

Figure 26:
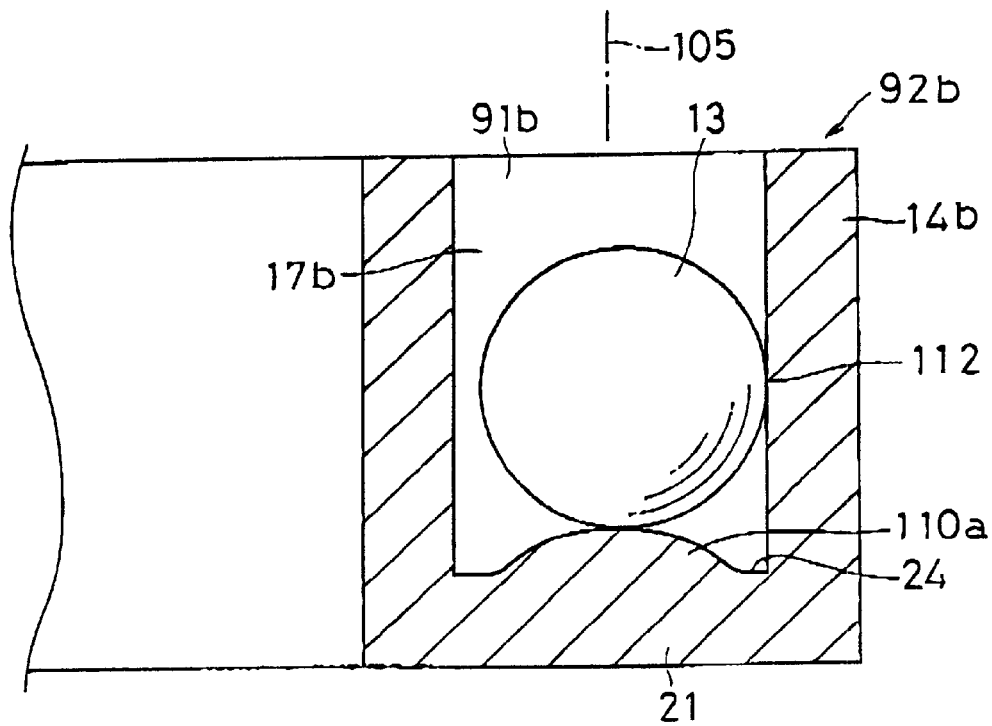
FIG. 26 is a vertical sectional view showing a modification of the recess.

FIG. 26 is a vertical sectional view of a portion of yet another embodiment of the present invention. This embodiment is substantially similar to the embodiment shown in FIGS. 20 through 25 in basic configuration, and components of this embodiment corresponding to the components of the embodiment shown in FIGS. 20 through 25 are given the same reference symbols. In particular, in this embodiment, the upper surface 24 of the bottom portion 21 of each recess 91b of the holding member 14b rises and curves gently to form a projection 110a. That is, the surface of the projection 110a may be a part of a sphere. The projection 110a is so formed as to be rotationally symmetrical about the axis 105, and supports the moving body 13 at an extremely unstable state in which a single point on the projection 110a is in point contact with the moving body 13. Also in this embodiment, as in the embodiment of FIGS. 20 through 25, circumferential vibration energy of the sleeve 4 can be absorbed and dissipated efficiently.

Figure 27:
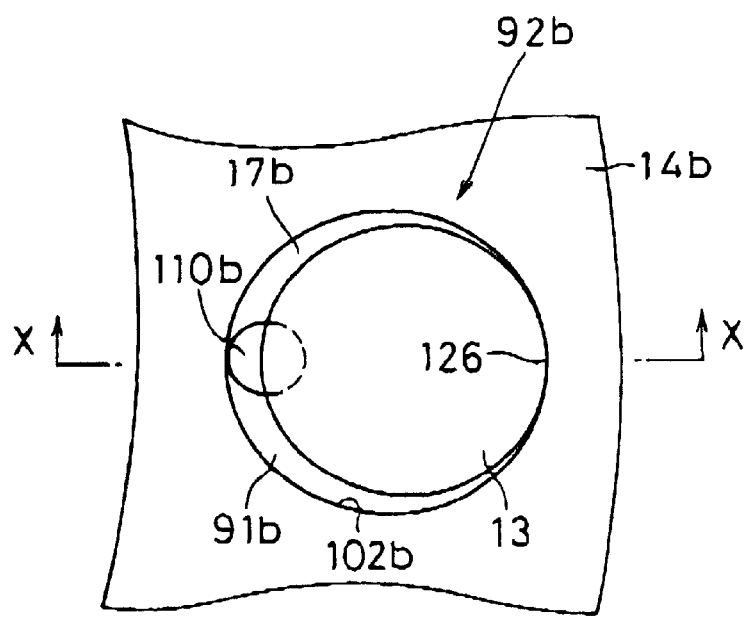
FIG. 27 is a schematic illustration showing relationship of a recess, a moving body and a projection in a holding member 14b according to further modification of the recess.
Figure 28:
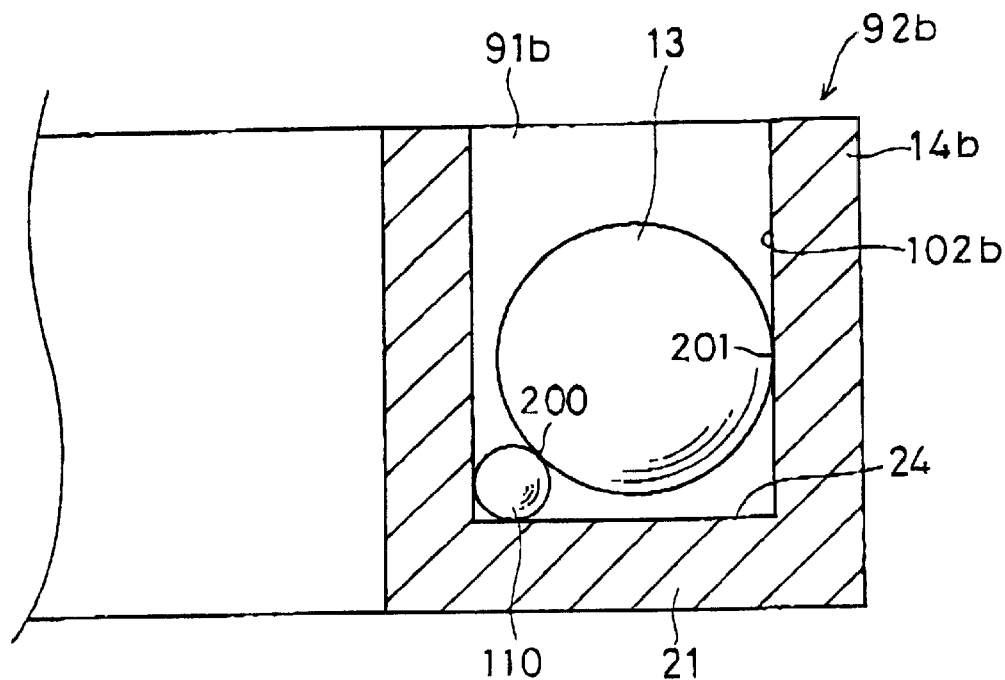
FIG. 28 is a vertical sectional view taken along line X—X.

FIG. 27 is a schematic plan view of a portion of a holding member 14b according to still another embodiment of the present invention, and FIG. 28 is a sectional view taken along a line X—X in FIG. 27. In this embodiment, a projection 110b which has a spherical outer shape is smaller in diameter than the moving body 13 is used instead of the above-described projection 110 or 110a. The upper surface 24 of the bottom portion 21 is horizontal and perpendicular to the axis 5 of the stationary shaft 3. A ball 110b serving as a projection 110b is accommodated in the recess 91b so as to move under the moving body 13. The projection 110b supports the moving body 13 at an unstable state in which the projection 110b is in point contact with the moving body 13 at a single point 200. As in the above embodiments, the moving body 13 is in point contact with the inside wall surface 102b of the recess 91b at a position 201. Also in this embodiment, when the holding member 14b vibrates radially or circumferentially about the axis 5 together with the sleeve 4, the moving bodies 13 move while, for example, colliding against the inside wall surfaces 102b of the recesses 91b, whereby the vibration can be suppressed efficiently and effectively. The other structures of this embodiment (FIGS. 27 and 28) are similar to the corresponding structures of the embodiment of FIGS. 20 through 25.

Figure 29:
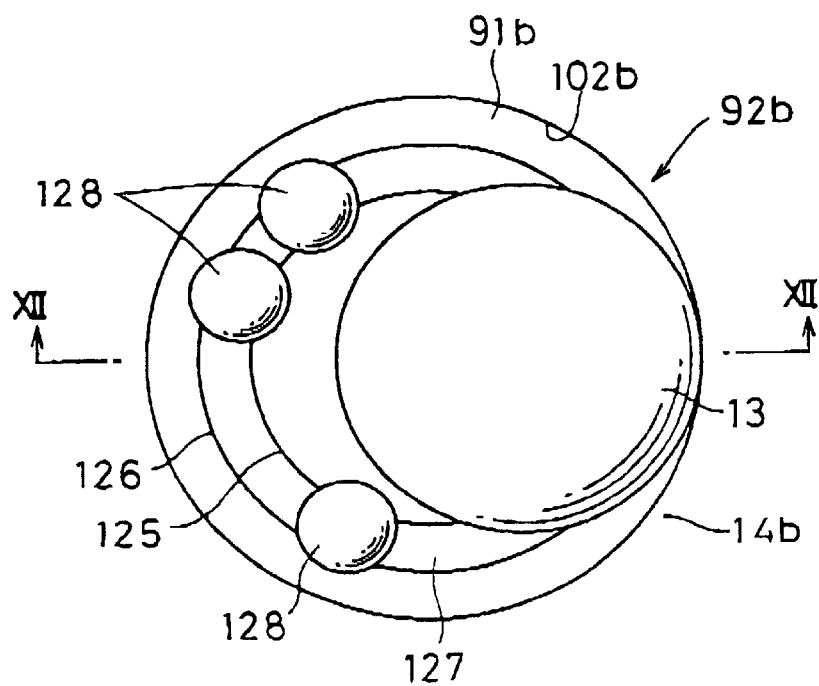
FIG. 29 is a plan illustration of a still further modified recess structure of a holding member according to another embodiment of the invention.
Figure 30:
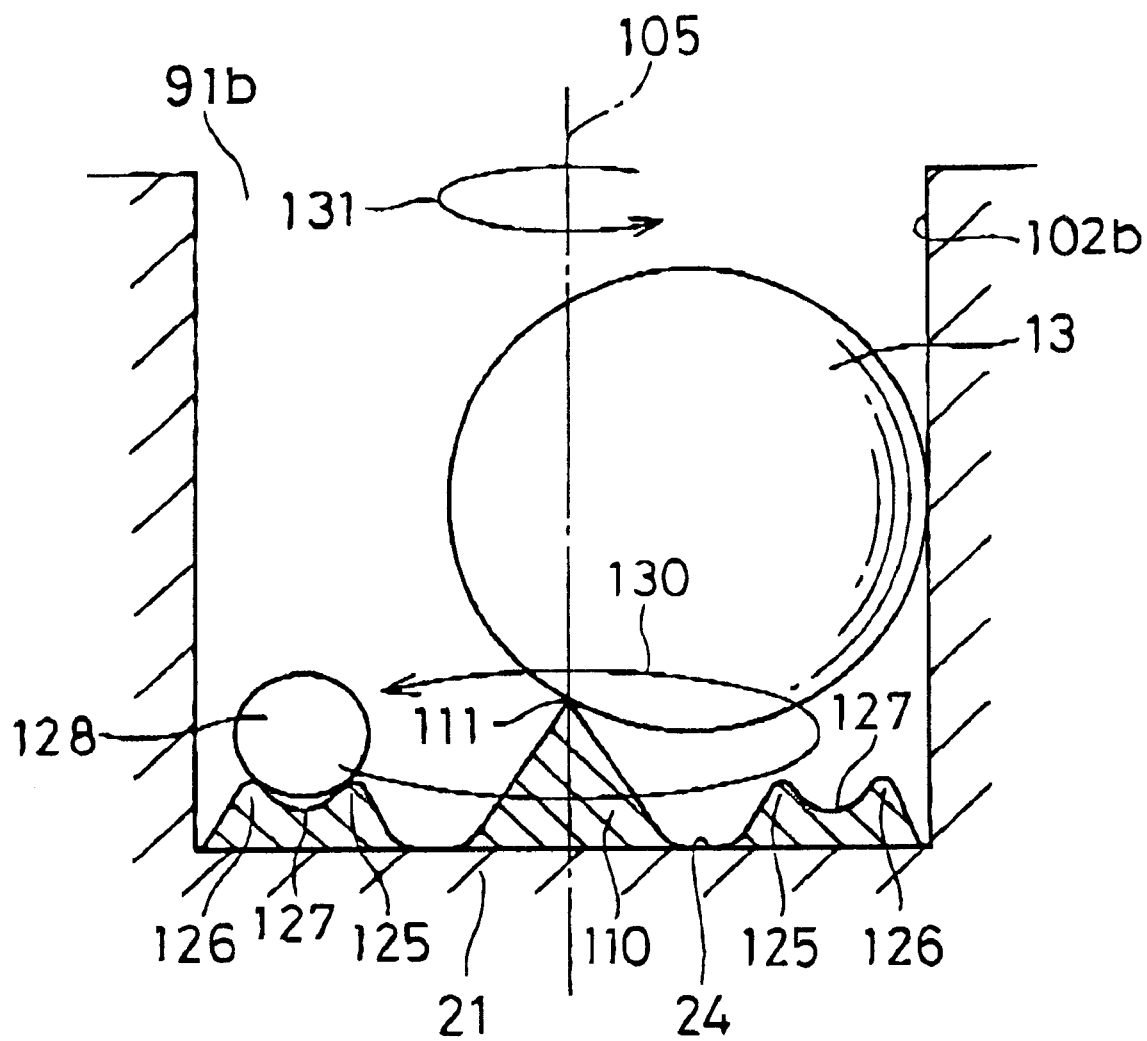
FIG. 30 is a vertical sectional view taken along line XII—XII in FIG. 29.

FIG. 29 is a plan view of part of a holding member 14b according to still yet another embodiment of the present invention and FIG. 30 is a vertical sectional view taken along line XII—XII in FIG. 29. In this embodiment, a cone-shaped projection 110 which is the same as the projection of the embodiment shown in FIGS. 19 through 24 is formed on the bottom portion 21 of each recess 91b. The moving body 13 is held in an unstable state in which the moving body 13 is in contact with the apex 111 of the projection 110 and the inside wall surface 102b. Two continuous annular guide projection rails 125 and 126 are also formed on the bottom portion 21 of the recess 91b around the axis 105. An annular groove 127 is formed between the guide projection rails 125 and 126. An auxiliary moving body 128 is guided by the guide projection rails 125 and 126. The auxiliary moving body 128 is movable above the bottom surface 21 and has a spherical shape which is smaller in diameter than the moving body 13. Since the guide projection rail 125 are lower than the projection 110, they do not contact the moving body 13. The auxiliary moving body 128 can move as indicated by arrow 130 while being in point contact with the guide, projection rails 125 and 126. Whereas the moving body 13 can move on the inside wall surface 102b as indicated by arrow 131, it can go over the projection 110 and then collide against the inside wall surface 102b. In this manner, vibrations of the sleeve 4 in the circumferential and radial directions can be absorbed efficiently and effectively. The auxiliary moving body 128 collides against the moving body 13, thereby also absorbing vibration energy of the sleeve 4 efficiently. The, other structures of this embodiment (FIGS. 29 and 30) are similar to the corresponding structures of the embodiment shown in FIGS. 20 through 25.

Figure 31:
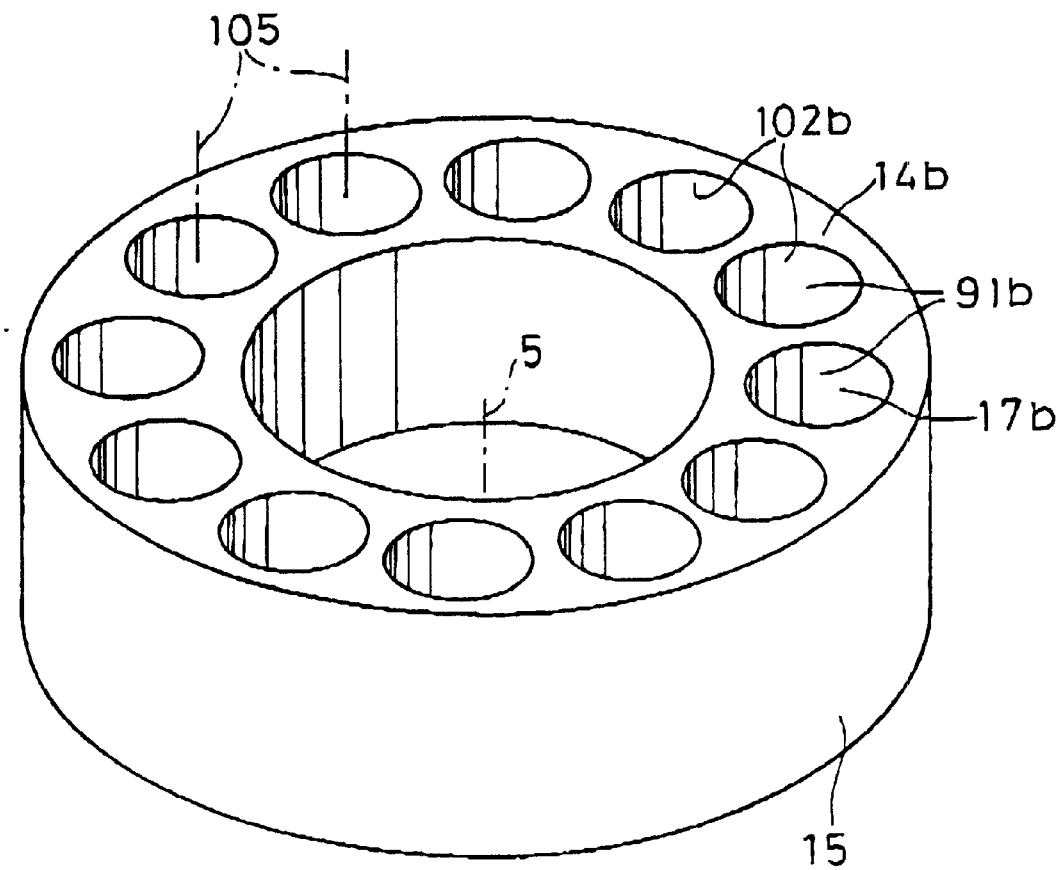
FIG. 31 is a perspective view of a holding member used for a bearing device according to yet further embodiment of the present invention.

A further embodiment of the present invention will be described below with reference to FIGS. 31 through 34. This embodiment is similar to the embodiment shown in FIGS. 1 and 17 through 21, and the components of this embodiment corresponding to the components of the embodiment shown in FIGS. 1 and 17 through 21 are given the same reference symbols as those of the latter. FIG. 31 is a perspective view of a holding member 14b which is provided in each damper 8. Each damper 8 has moving bodies 13 and an annular holding member 14b. Each moving body 13 is, for example, spherical in this embodiment, and the plurality of moving bodies 13 have the same structure. The outside circumferential surface 15 of the holding member 14b is fixed to the inside circumferential surface of the sleeve 4. The holding member 14b may be made of metal such as iron or a synthetic resin material, and is rigid.

A plurality of cylindrical recesses 91b (e.g., twelve recesses in this embodiment) are formed in the holding member 14b to serve as a holding portion. The vertical axes 105 of the cylindrical recesses 91b are on an imaginary circle 106 which is concentric with the stationary shaft 3 and the sleeve 4 with respect to the axis 5. The recesses 91b are arranged at substantially equal intervals along the imaginary circle 106. A cylindrical space 17b is defined by the inside wall surface 102b of each recess 91b. That is, the inside wall surface 102b of each recess 91b has a central axis 105 which is parallel with the axis 5 of the stationary shaft 3. The cross-sections of the wall surfaces 102b taken perpendicularly to the axis 105, are circles in shape which are uniform along the axis 105. Each recess 91b accommodates a single moving body 13.

Figure 32:
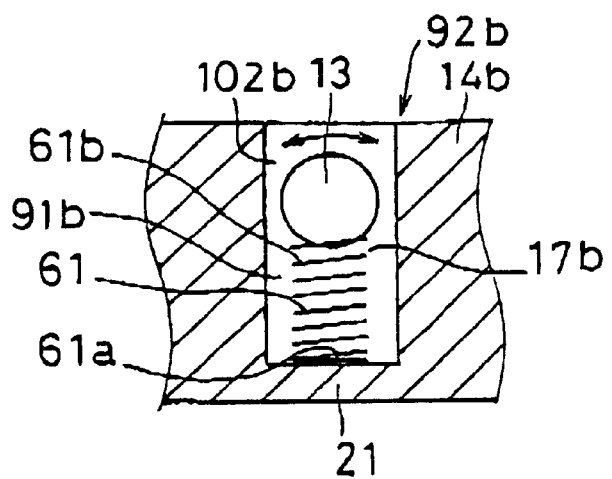
FIG. 32 is a vertical sectional view of a recess of the holding member shown in FIG. 31.

FIG. 32 is a sectional view of each recess 91b and its associated structure. One end 61a of a cylindrical coil spring 61 as an elastic body is fixed to the bottom portion 21 of the associated recess 91b. The moving body 13 is fixed to the other end 61b of the spring 61. The coil spring 61 and the moving body 13 constitute a damping member, and the damping member and the recess 91b constitute a damping portion 92b.

Figure 33:
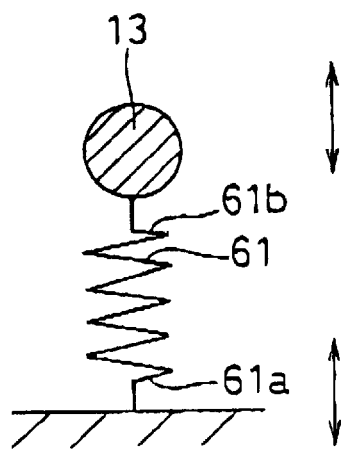
FIG. 33 shows operation of the moving body in the embodiment shown in FIG. 32.

FIG. 33 shows a vibration action of the moving body 13 inn this embodiment (FIGS. 31 and 32).

As shown in FIG. 33, the moving body 13 can be modeled by using mass m of the moving body 13 and the spring constant k of the spring 61. When one end portion 61a of the spring 61 is vibrated at a frequency ω with an amplitude x0, the distance between the mass m and the fixed end varies by x0−x. Therefore, force F corresponding to the variation in distance $$F = k(x0 - x) \tag{17}$$

is applied to the mass m and the mass m starts to vibrate. Character x represents the amount of the displacement of the mass m.

Equation (17) is rewritten as $$m\frac{d^2 x}{dt^2} = k(x0 - x) \tag{18}$$

$$m\frac{d^2 x}{dt^2} + kx = kx0 \tag{19}$$

Equation (19) means that this motion is equivalent to vibration which is caused externally by force of kx0.

The steady-state solution of such a response is as follows:

$$x = \frac{kx0}{k - m\omega^2} = \frac{X0}{1 - \left(\frac{\omega}{\omega 0}\right)^2} \tag{20}$$

where a natural frequency ω0 is given by $$\omega 0 = \sqrt{k/m} \tag{21}$$

A mode ratio ω is given by $$\phi = x/x0 = \frac{1}{1 - \left(\frac{\omega}{\omega 0}\right)^2} \tag{22}$$

As is understood from Equations (20) and (21), the amplitude of vibration of the mass m varies with the excitation frequency. In particular, the amplitude of vibration steeply, varies in the vicinity of ω0 as shown in FIG. 34.

Figure 34:
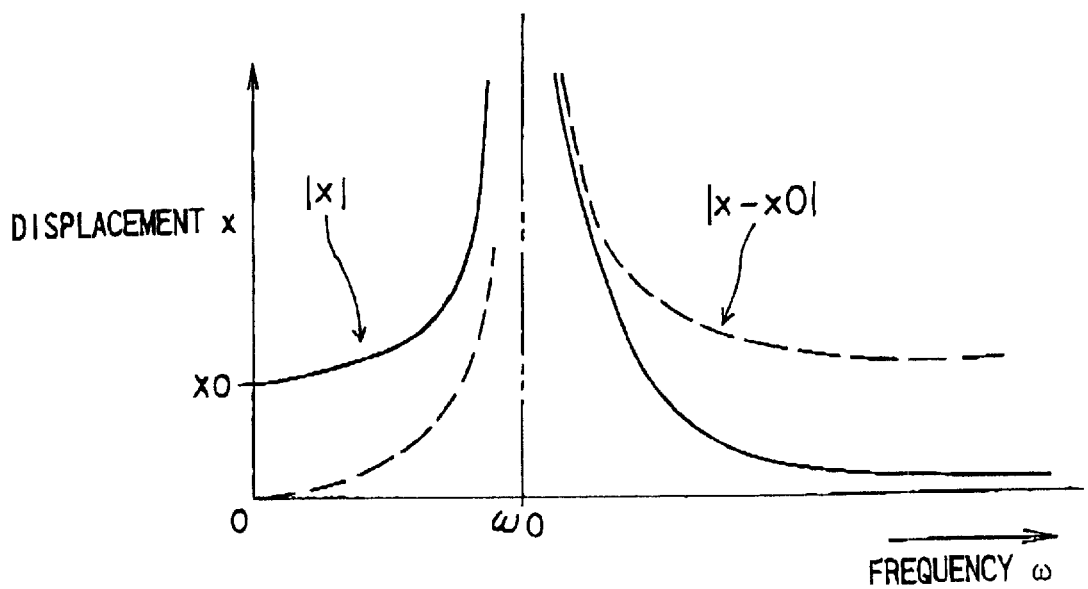
FIG. 34 is a graph showing vibration characteristic of the moving body shown in FIG. 33.

FIG. 34 is a graph showing a vibration characteristic of the moving body 13 shown in FIG. 33. From Equation (20), the relative amplitude between the moving body 13 and the support portion 61a is calculated as follows:

$$x - x0 = \frac{x0}{1 - \left(\frac{\omega}{\omega 2}\right)^2} - x0 = \frac{\left(\frac{\omega}{\omega 0}\right)^2}{1 - \left(\frac{\omega}{\omega 0}\right)^2} x0 \tag{23}$$

It is understood that the relative amplitude varies as indicated by broken lines in FIG. 34.

In FIG 34, the amplitude of vibration is shown as an absolute value. According to Equation (22), φ=x/x0 steeply increases with ω in a range of ω<ω0. The phase is reversed when ω exceeds ω0 and ω=x/x0 has a negative value in a range of ω≧ω0. In other words, whereas in the range of ω<ω0 the response is such that the mass m moves upward as the support portion 61a of the spring 61 moves upward, in the range of ω≧ω0 the mass m moves downward as the support portion 61a moves upward, that is, the mass m moves in such a direction that it may collide against the support portion 61a. That is, in the present invention, ω is set somewhat larger than ω0 so that the moving body 13 contacts the inside wall surface 102b very easily.

A description from a different standpoint than in the above descriptions is made here. The above descriptions were made from the standpoint that the support portion is excited at the frequency ω. However, it is intended to apply the present invention to the dampers 8 of a pivot. Since the pivot and an actuator have a certain natural frequency Ω0 depending on their structures, excitation should be made at the frequency Ω0. In the present invention, settings are so made that the natural, frequency ω0 of each damper 8 is approximately equal to Ω0 so that large vibration occurs when excitation is made at the frequency Ω0.

When the sleeve 4 vibrates in the circumferential direction and in the radial direction, the vibration is amplified by the springs 61 and, as a result, the moving bodies 13 vibrate while moving violently. Thereby, even when the sleeve 4 slightly vibrates, the moving bodies 13 collide against the inside wall surfaces 102b of the recesses 91b. The impacts of those collisions can stop the circumferential movement of the sleeve 4 and absorb and dissipate the vibration energy of the sleeve 4. In a natural state, the central axis of the spring 61 coincides with the axis 105 of the cylinder of the recess 91b and the center of gravity, that is, the geometrical center, of the moving body 13 is located on the axis 105. Therefore, the moving bodies 13 can surely collide against the inside wall surfaces 102b when the sleeve 4 vibrates and hence the vibration damping effect can be increased since such damping portions 92b are arranged circumferentially at equal intervals, vibration can be attenuated uniformly and effectively in the same manner as in the above embodiments. The structure of other portion of this embodiment (FIGS. 31 through 34) are similar to the corresponding structures of the embodiment shown in FIGS. 20 and 21.

Figure 35:
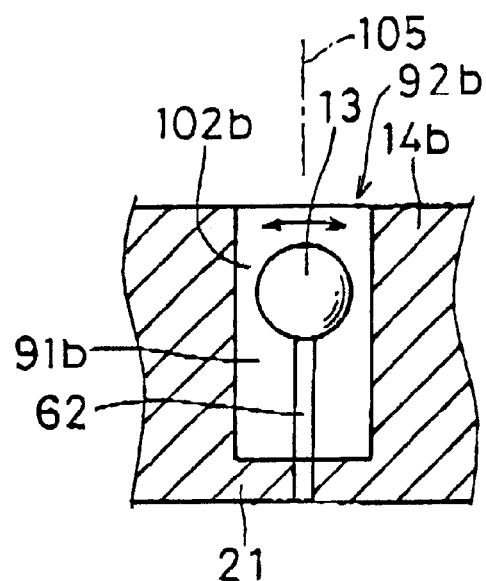
FIG. 35 is a vertical sectional view showing a modification of moving body supporting structure.

FIG. 35 is a schematic vertical sectional view showing another embodiment of the present invention This embodiment is substantially similar to the embodiment shown FIGS. 31 through 34 in its basic configuration, and components of this embodiment corresponding to the components of the embodiment shown in FIGS. 31 through 34 are given the same reference symbols as those of the latter. In this embodiment, instead of the coiled spring 61 of the embodiments shown in FIGS. 31 through 34 is used a rod-shaped elastic or resilient member 62 as an elastic body. The rod-shaped elastic member 62 is made of metal such as piano wire which is superior in elasticity, or synthetic resin, rubber, or a like material. The central axis of the elastic member 62 coincides with the axis 105 of the recess 91b in a natural state, and its cross-sections perpendicular to the axis are circles which are uniform along the axis 105.

Figure 36:
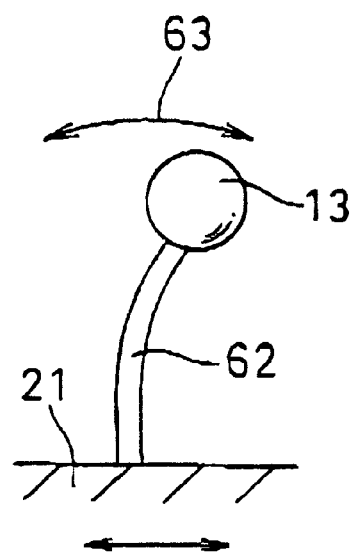
FIG. 36 is a schematic illustration showing operation of the moving body shown in FIG. 35.

FIG. 36 is an illustrative sectional view showing the operation of the embodiment (FIG. 35) in a case where a radial or circumferential vibration occurs in the sleeve 4 and hence in the holding member 14b. The vibration of the sleeve 4 causes the moving body 13 to vibrate in a manner indicated by arrow 63 and the moving body 13 collides against the inside wall surface 102b of the recess 91b, whereby as in the embodiment shown in FIGS. 31 through 34, the vibration energy of the sleeve 4 is absorbed and dissipated in this embodiment.

Figure 37:
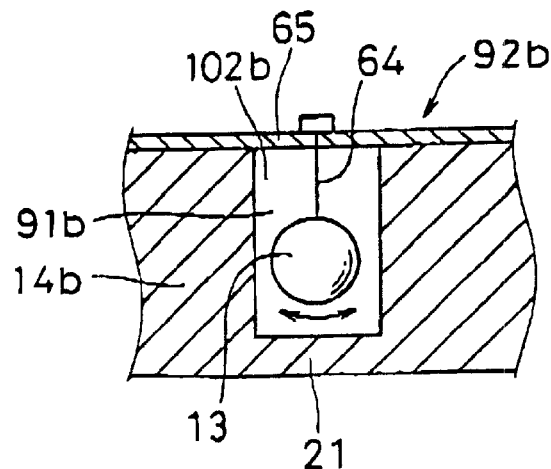
FIG. 37 is a vertical sectional view of further modification of the moving body supporting structure.

FIG. 37 is a vertical sectional view of a portion of another embodiment of the present invention. This embodiment is substantially similar to the above embodiments in its basic configuration and components of this embodiment corresponding to the components of the above embodiments are given the same reference symbols as those of the latter. A rod-shaped elastic member 64 is fixed to a lid member or cover plate 65 which is a part of the holding member 14b, and the moving body 13 is suspended by the elastic member 64. Alternatively, the lid member or cover plate 65 may be a part of the holding member 14b, that is, the bottom portion 21. As in the aforementioned embodiments, in the structure of this embodiment in which the moving body 13 is suspended by the elastic member 64, the moving body 13 collides against the inside wall surface 102b of the recess 91b, whereby the vibration energy of the sleeve 4 is absorbed efficiently.

Figure 38:
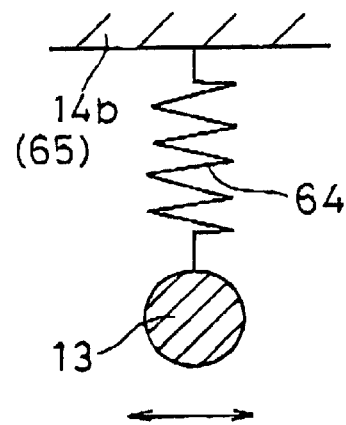
FIG. 38 illustrates operation of the moving body shown in FIG. 37.

FIG. 38 illustrates the principle of vibration in this embodiment (FIG. 37) When the holding member 14b is displaced by circumferential vibration of the sleeve 4, the moving body, 13 which is supported via the elastic member 64 vibrates with an amplified amplitude. In this manner, the moving bodies 13 efficiently collide against the inside wall surfaces 102b of the recesses 91b and can thereby absorb the vibration energy of the sleeve 4.

The operation of the present embodiment can be modeled in completely the same manner as that of the aforementioned embodiments shown in FIGS. 32 through 36 where a spherical body is supported by a spring although the direction of displacement is different from that of the embodiment shown in FIG. 37. That is, when excitation is made at the natural frequency $\omega 0$ (see Equation (21)) which is determined by the mass m of the vibrating portion and the supporting rigidity k of the elastic member 61, 62, or 64 which supports the vibrating portion, the mass m resonates and vibrates with an amplified amplitude x which is tens to hundreds of times greater than the amplitude x0.

Although the damping effect of the elastic member 61, 62, or 64 is not taken into account in the above descriptions, it does not cause any difference from each other in the principle of operation. It is understood that the damping effect of the elastic member 61, 62, or 64 is in such a degree that the amplitude of responsive vibration is decreased to a certain finite value rather than becomes infinite.

Figure 39:
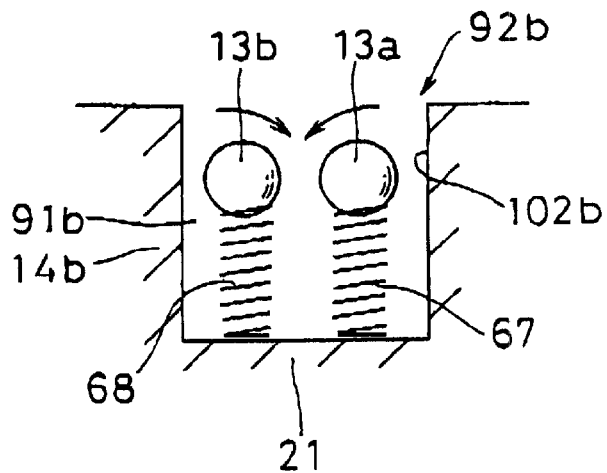
FIG. 39 is a schematic vertical sectional view showing another modification regarding the moving body.

FIG. 39 is a sectional view of a portion of still further embodiment of the present invention. This embodiment is substantially similar to the above described embodiments in its basic construction, and components of this embodiment corresponding to the components of the above embodiments are given the same reference symbols as those of the latter. In this embodiment, a plurality of (in this embodiment, two) moving bodies 13a and 13b are accommodated in each recess 91b of the holding member 14b. One end portions of the two respective coiled springs 67 and 68 are fixed to the bottom portion 21 and the other end portions are fixed to the respective moving bodies 13a and 13b. The combination of the moving body 13a and the spring 67 and the combination of the moving body 13b and the spring 68 are arranged with a gap around the axis 5, that is, in the circumferential direction of the holding member 14b.

Figure 40:
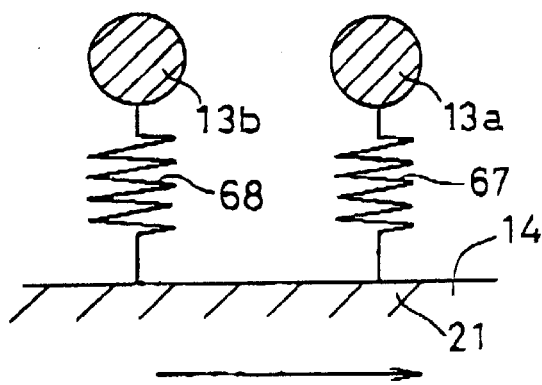
FIG. 40 is a schematic illustration showing the operation of moving bodies of the embodiment shown in FIG. 39.

FIG. 40 is an illustrative sectional view showing how the moving bodies 13a and 13b vibrate in this embodiment (FIG. 39). When the sleeve 4 vibrates in the circumferential direction, the vibration is amplified by the action of the springs 67 and 68 and causes movement of the moving bodies 13a and 13b, whereby the moving bodies 13a and 13b collide against each other. The moving bodies 13a and 13b also collide against the inside wall surface 102b of the recess 91b. In this manner, the vibration energy can be absorbed effectively.

The phase of a response in a case where excitation is made at a frequency higher than the natural frequency (or the resonance point) is opposite to that in a case where excitation is made at a frequency lower than the natural frequency. Therefore, the moving bodies 13a and 13b move at opposite phases if for the holding member 14 which is excited at $\Omega 0$ one natural frequency $\omega 1$ is so set as to satisfy a condition $\omega 1 < \Omega 0$ and the other natural frequency $\omega 2$ is so set as to satisfy a condition $\Omega 0 < \omega 2$.

As shown in FIG. 39, in practice the moving bodies 13a and 13b cannot contact each other unless they are located at the same coordinate. Therefore, $\omega 1 = \sqrt{k1/m1}$ and $\omega 2 = \sqrt{k2/m2}$ may, be adjusted by making the spring constants k1 and k2 (by the structures of the springs 67 and 68) different from each other or making the mass m1 and m2 different from each other. In this connection, as for the coiled springs 67 and 68, there are many choices because the rigidity of a coiled spring varies depending on the length, the wire diameter, the number of turns of a wire, the coil winding diameter, the wire material, etc. The other structures of this embodiment (FIGS. 39 and 40) are the same as that of the above described embodiments.

Figure 41:
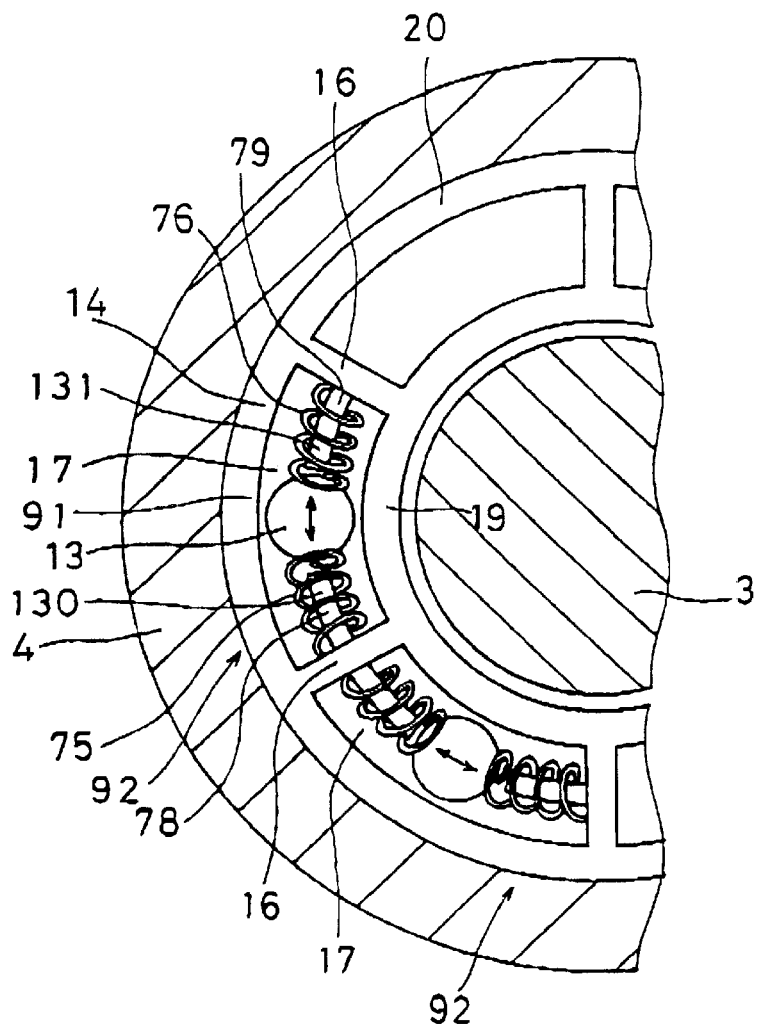
FIG. 41 is a partial sectional view of a damper part according to yet another embodiment of the invention.

FIG. 41 is a horizontal sectional view of a portion of yet further embodiment of the present invention. This embodiment is substantially similar to the above described embodiments in its basic construction, and components of this embodiment corresponding to the components of the above described embodiments are given the same reference symbols as those of the latter. In this embodiment, each spherical moving body 13 is resiliently held by a pair of oil springs 75 and 76 which are accommodated in the space 17 of the holding member 14 bone ends of the respective springs 75 and 76 are fixed to respective partition walls 16 of the recess 73 and the other ends are fixed to the common moving body 13. The base portions of the collision pieces 78 and 79 which extend from respective opposite partition walls 16 pass through the respective springs 75 and 76. When the sleeve vibrates in the circumferential direction, the vibration is transmitted to the moving body 13 in an amplified manner, whereby the moving body 13 collides against the adjacent free ends 130 and 131 of the respective collision pieces 78 and 79. Those collisions absorb the vibration energy of the sleeve 4. The embodiment may be modified such that the collision pieces 78 and 79 are fixed to the moving body 13 and collide, against the respective partition walls 16. The collision pieces 78 and 79 pass through the respective springs 75 and 76 in a concentric manner. Also in this embodiment, since the damping portions 91 are arranged circumferentially substantially at equal extension, vibration can be attenuated effectively in the same manner as in the embodiment shown in FIGS. 31 through 34.

Another type of elastic member made of such a material as piano wire may be used instead of the coiled spring. Such an elastic member may be made of a material other than metal, such as synthetic resin or rubber.

Next, fourth group of embodiments of the present invention will be described with reference to FIGS. 42 and 43. The fourth group embodiment is implemented in the same manner as the first and second groups of the invention, and the components of the third group corresponding to the components of the first or second group are given the same reference symbols as those of the latter.

Figure 42:
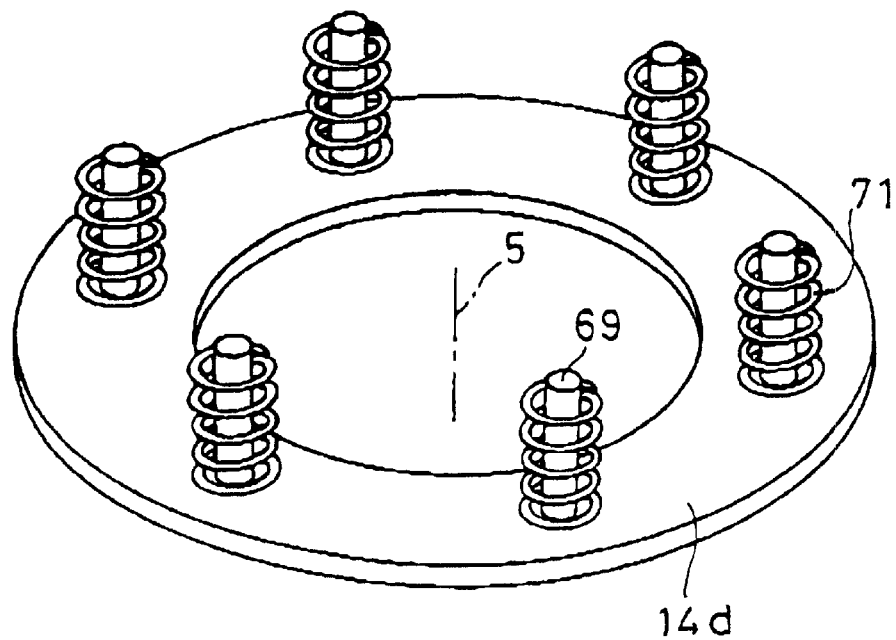
FIG. 42 is a perspective view showing a holding member. according to still another embodiment of the invention.

FIG. 42 is a perspective view of a holding member 14d according to another embodiment of the present invention. Like the holding members 14a–14c of the above described embodiments, the holding member 14d is fixed to the sleeve 4. The holding member 14d is a flat, ring-shaped plate. The base portions of respective rod-shaped collision pieces 69 are fixed to the holding member 14d with the centers of gravity of the collision pieces 69 being on an imaginary circle about the axis 5 as its center. Each collision piece 69 is substantially cylindrical with its axis being parallel with the axis 5 like the above-described axis 105. The collision pieces 69 are arranged in the circumferential direction at equal intervals. The base portions of respective coil springs 71 are fixed to the top surface of the holding member 14d. The central axis of each coil spring 71 in a natural state coincides with the axis of the associated collision piece 69. Holding portions are formed by portions of the holding member 14d in the vicinity of each position where a collision piece 69 is erected. The holding portion, the coil spring 71 as a damping piece, and the collision piece 69 constitute a damping portion. For example, six damping portions are arranged in the circumferential direction at equal intervals. When vibration of the sleeve 4 causes the holding member 14b to vibrate, the springs 71 are displaced, that is, vibrated, with an amplified amplitude. As a result, the inside circumferential surfaces of the spring 71 collide against the outside circumferential surfaces of the respective collision pieces 69 Those collisions absorb and dissipate the vibration energy of the sleeve 4.

Figure 43:
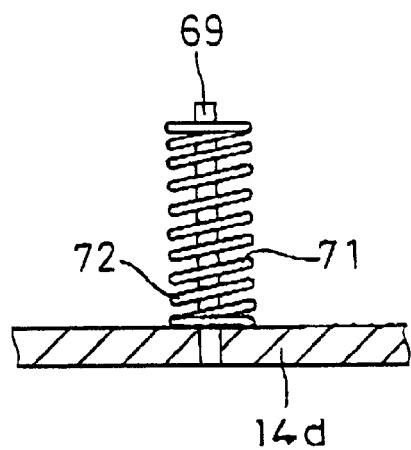
FIG. 43 illustrates a set of a collision piece and a spring shown in FIG. 42.

FIG. 43 is a sectional view showing a combination of a collision piece 69 and a spring 71 as shown in FIG. 42. The spring 71 is configured in such a manner that a wire made of metal or a like material is wound spirally so as to be circular in cross-sections taken perpendicularly to the axis. The base portion 72 of the coil spring 71 is inserted into the collision piece 69 and fixed to the holding member 14d as described above. The axial length of the coil spring 71 is approximately equal to that of the collision piece 69. With this structure, the spring 71 can surely collide against the collision piece 69 while vibrating. The other structures of this embodiment (FIGS. 42 and 43) are the same as in the above embodiments. Also in this embodiment, since the damping portions 92d are arranged in the circumferential direction at regular intervals, vibrations in the circumferential and radial directions can be attenuated effectively in the same manner as in the above embodiments.

As another embodiment of the invention, the dampers 8 of each of the embodiments of FIGS. 17 through 43 may be attached to the sleeve 4 via the buffer members 31–33 which are used in the embodiment of FIG. 9. This structure makes it possible to absorb vibration energy more effectively.

Each of the embodiments shown in FIGS. 21 through 43 can be practiced in relation to the head driving device 46 for a disk drive shown in FIG. 14. It has been confirmed that vibration which is caused by high-speed movement of the arm 44 can be suppressed in the manner shown in FIGS. 15 and 16 also in the embodiments of FIGS. 21 through 43, as in the preceding embodiments.

In all embodiments, damping portions or elements are circularly arranged at equal intervals or extensions, but they may be arranged in other regularity in accordance with vibration absorbing characteristics as required.

The present invention may be embodied in other specific forms without departing from the spirit or essential characteristics thereof. The present embodiments are therefore to be, considered in all respects as illustrative and not restrictive, the scope of the present invention being indicated by the appended claims rather than by the foregoing description and all changes which come within the meaning and the range of equivalency of the claims are therefore intended to be embraced therein.

What is claimed is:

1. A bearing device for supporting an arm which carries a head for reading or writing data on a data storage disk, the arm being angularly displaceable around an axis; said bearing device comprising:

a stationary shaft concentric with the axis;

a sleeve coupled with the arm to turn integrally with the arm;

a bearing interposed between the stationary shaft and the sleeve for supporting the sleeve on the shaft for angular displacement of the sleeve; and a damper coupled with the sleeve for damping the vibration of the sleeve and the arm, the damper including a plurality of holding portions arranged circumferentially around the axis at equal circumferential intervals or extensions, each of the holding portions having an inner space and a damping mass movably accommodated in the inner space, wherein the damper is attached to the radially inner surface of the sleeve via an annular elastic member.

2. The bearing device of claim 1, wherein a plurality of dampers are attached to an inner surface of the sleeve.

3. The bearing device of claim 1, wherein one inner wall surface of each of the holding portions are made of elastic material.

4. The bearing device of claim 1, wherein the inner space of the respective holding portion is to be hermetically sealed, liquid is accomnmodated in the inner space of the respective holding portion, and a rigid damping mass is in the liquid.

5. The bearing device of claim 1, wherein the inner space of the respective holding portion is hermetically sealed, and a liquid as the damping mass is accommodated in the inner space of the respective holding portion therein.

6. The bearing device of claim 1, wherein the inner space of the respective holding portion is hermetically sealed, a powder as the damping mass is accommodated in the inner space of the respective holding portion.

7. The bearing device of claim 1, wherein the inner space of the respective holding portion is formed as a cylindrical shape having an axis parallel with the axis of the shaft, and one spherical damping mass is movably accommodated in the inner space of the respective holding portion.

8. The bearing device of claim 7, wherein the cylindrical inner space of each holding portion has an opening at a radially inner side of the damper and the size of the opening is narrower that a diameter of the spherical damping mass.

9. The bearing device of claim 1, wherein the inner space of each respective holding portion has a sector shape in a horizontal cross-section and the respective damping mass has a sector shape in a horizontal cross-section and is movably accommodated in the inner space, each circumferential surface defining the sector-shaped space in the respective holding portion has a shape of a part of a cylindrical surface with its central axis concentric with the axis of the shaft, and each radial surface of the sector-shaped damping mass is shaped with its central axis coinciding with the axis of the shaft, and each side surface of the sector-shaped damping mass is shaped as a part of a plane passing through the axis of the shaft.

10. The bearing device of claim 9, wherein the damping mass is made of synthetic resin.

11. The bearing device of claim 9, wherein the damping mass is made of rubber.

12. A bearing device for supporting an arm which carries a head for reading or writing data on a data storage disk, the arm being angularly displaceable around an axis; said bearing device comprising:

a stationary shaft concentric with the axis;

a sleeve coupled with the arm to turn integrally with the arm;

a bearing interposed between the stationary shaft and the sleeve for supporting the sleeve on the shaft for angular displacement of the sleeve;

a damper coupled with the sleeve for damping the vibration of the sleeve and the arm, the damper including a plurality of holding portions arranged circumferentially around the axis at equal circumferential intervals or extensions, each of the holding portions having an inner space and a damping mass movably accommodated in the inner space, wherein the damper is attached to the radially inner surface of the sleeve via an annular elastic member, and wherein the inner space of the respective holding portion is cylindrical with its axis being in parallel with the axis of the shaft, and one spherical damping mass is movably accommodated in the inner space of the respective holding portion;

the spherical damping mass has a radius which has a predetermined relationship with the inner space of the holding portion; and a sharp-top projection is provided on the bottom of the respective inner spaces at the vicinity of the axis of the cylindrical space, a height of the projection is in a predetermined relationship with the inner space of the holding portion.

13. The bearing device of claim 12, wherein the damper further includes:

two annular guide projection rails formed on the bottom of the inner space of the respective holding portions, each annular center of the guide projection rails coincides with the axis of the cylindrical inner spaces; and small damping mass balls are movably placed on the guide projection rails.

14. A bearing device for supporting an arm which carries a head for reading or writing data on a data storage disk, the arm being angularly displaceable around an axis; said bearing device comprising:

a stationary shaft concentric with the axis;

a sleeve coupled with the arm to turn integrally with the arm;

a bearing interposed between the stationary shaft and the sleeve for supporting the sleeve on the shaft for angular displacement of the sleeve;

a damper coupled with the sleeve for damping the vibration of the sleeve and the arm, the damper including a plurality of holding portions arranged circumferentially around the axis at equal circumferential intervals or extensions, each of the holding portions having an inner space and a damping mass movably accommodated in the inner space, wherein the inner space of the respective holding portion is cylindrical with its axis being in parallel with the axis of the shaft, and one spherical damping mass is movably accommodated in the inner space of the respective holding portion;

the spherical damping mass has a radius which has a predetermined relationship with the inner space of the holding portion; and a gentle projection is provided on the bottom of the respective inner spaces at the vicinity of the axis of the cylindrical space.

15. A head assembly in a disk apparatus having at least one disk, comprising:

a fixed shaft having an outer surface, the shaft generally defining an axis of angular displacement;

a sleeve having an inner surface, the sleeve disposed about the fixed shaft;

a bearing interposed between the fixed shaft and the sleeve for supporting the sleeve on the shaft for angular displacement of the sleeve;

an arm coupled to the sleeve, being angularly displaceable around an axis of rotation of the arm and supporting a head for writing or reading information on the disk surface therefrom;

an actuator providing a driving force for angularly displacing the arm;

a damper coupled with the sleeve for damping the vibration of the sleeve and the arm, the damper including a plurality of holding portions arranged circumferentially around the axis of rotation of the arm at equal circumferential intervals or extensions, each of the holding portions having an inner space and a damping mass movably accommodated in the inner space for movement within the inner space and absorbing vibrational energy from the sleeve and the arm by collision of the damping mass with the walls of the inner space.

* * * * *